United States Patent [19]
Tada et al.

[11] Patent Number: 5,797,380
[45] Date of Patent: Aug. 25, 1998

[54] AIR INTAKE SYSTEM FOR INTERNAL COMBUSTION ENGINE

[75] Inventors: Yasuo Tada; Tomoya Yamakawa; Hiroyuki Uramachi, all of Tokyo, Japan

[73] Assignee: Mitsubishi Denki Kabushiki Kaisha, Tokyo, Japan

[21] Appl. No.: 968,972

[22] Filed: Nov. 12, 1997

[30] Foreign Application Priority Data

Mar. 28, 1997 [JP] Japan ................................ 9-078390

[51] Int. Cl.$^6$ ........................................ F02M 23/14
[52] U.S. Cl. ............................................. 123/572
[58] Field of Search ......................... 123/572, 573, 123/574

[56] References Cited

U.S. PATENT DOCUMENTS

| | | | |
|---|---|---|---|
| 3,116,727 | 1/1964 | Dietrich | 123/572 |
| 4,345,573 | 8/1982 | Obata | 123/572 |
| 4,922,882 | 5/1990 | Topfer | 123/572 |

FOREIGN PATENT DOCUMENTS

| | | |
|---|---|---|
| 61-95916 | 6/1986 | Japan . |
| 61-99617 | 6/1986 | Japan . |
| 5-64408 | 8/1993 | Japan . |

*Primary Examiner*—Marguerite McMahon
*Attorney, Agent, or Firm*—Sughrue, Mion, Zinn, Macpeak & Seas, PLLC

[57] ABSTRACT

An air intake system for an internal combustion engine which does not impair detection performance of a flow sensor without impairing intrinsic function thereof even when a distance between the flow sensor (4) and as inlet port (80) for a recirculating air is dimensioned short. The air intake system includes a recirculating air passage (8) for recirculating a blow-by gas (B) leaking into a crankcase (13) connected to an engine cylinder (1) to an intake air passage (2a). A positive crankcase ventilation system is provided which includes a communicating passage (18) for communicating interior of the crankcase (13) with that of a head cover assembly (14) of the cylinder (1), a recirculating passage (6) for introducing the blow-by gas (B) from the head cover assembly (14) into an intake air passage (2a) at a location downstream of a throttle valve (24), and a recirculating air passage (8) for introducing the recirculating air into the head cover assembly (14) from the intake air passage (2a) at a location intermediate between the flow sensor (4) and the throttle valve (24). The recirculating air passage (8) has a suction member (81) having one end portion disposed within the intake air passage (2a). The suction member (81) defines an air inlet passage having an inlet port (80) provided in the one end portion located at a downstream side relative to the center of the one end portion within the intake air passage (2a). Disturbance in the air stream occurring at the flow sensor is suppressed. Besides, protecting the flow sensor is protected against contamination even when the blow-by gas injected from the recirculating air passage (8).

20 Claims, 14 Drawing Sheets

AIR INTAKE SYSTEM FOR INTERNAL COMBUSTION ENGINE

BACKGROUND OF THE INVENTION

1. Field of the Invention

The present invention relates to an air intake system for an internal combustion engine equipped with a positive crankcase ventilation system (blow-by gas recirculating or feed back system also known as the PCB system) disposed in the vicinity of a flow sensor disposed at an upstream side in an intake air passage. More specifically, the invention is concerned with an air intake system for an internal combustion engine which system is designed for suppressing adverse influences of air suction by the positive crankcase ventilation system to the detection accuracy of the flow sensor.

2. Description of Related Art

Heretofore, it is well known in conjunction with operation of an internal combustion engine that there can take place leakage of unburned gas (generally known as the blow-by gas) from a cylinder into a crankcase during operation of the engine. Because the blow-by gas released to the atmosphere provides a cause for the air pollution, it is required to feed back such blow-by gas into an intake port or intake manifold of the engine by recirculation.

Such being the circumstances, a positive crankcase ventilation (PCV) system is disposed between the engine cylinder and an intake passage of the internal combustion engine for the purpose of feeding back the blow-by gas into the combustion process.

Concerning the intake system for the internal combustion engine equipped with such positive crankcase ventilation system, reference may be made to, for example, Utility Model Application Publication Nos. 95916/1986 (JP-UA-61-95916), 99617/1986 (JP-UA-61-99617) and Japanese Unexamined Patent Application Publication No. 203814/1984 (JP-A-59-203814).

For having better understanding of the present invention, technical background thereof will first be described in some detail. FIG. 27 is a structural diagram showing an intake system of an internal combustion engine equipped with a conventional positive crankcase ventilation system shown heretofore.

Referring to the figure, a combustion chamber 10 of a cylinder 1 constituting a major part of the internal combustion engine is provided with an intake air passage 2 for feeding intake air A into a combustion chamber 10 formed within the cylinder 1 and an exhaust gas passage 3 for discharging an exhaust gas E resulting from the combustion within the combustion chamber 10.

A piston 11 is disposed within the cylinder 1. In this conjunction, it is noted that an air gap G is formed between the piston 11 and an inner peripheral wall of the cylinder 1 for allowing the piston 11 to slide reciprocatively within the cylinder 1 under the energy generated upon explosive combustion of a gas mixture within the combustion chamber 10. The reciprocative motion of the piston 11 is transmitted as a torque to a crank shaft 12 operatively coupled to the piston 11, whereby the crank shaft 12 is driven rotationally. The crank shaft 12 is accommodated within a crankcase 13 which is combined integrally with the engine cylinder 1.

Mounted within a head cover assembly 14 covering the top of the cylinder 1 are a cam 15 for communicating the intake air passage 2 selectively with the combustion chamber 10 and a cam 16 for communicating the exhaust gas passage 3 selectively with the combustion chamber 10, wherein the cams 15 and 16 are disposed in juxtaposition with each other.

An injector 17 for injecting a fuel into the intake air passage 2 is disposed upstream of the cylinder 1 at a location closely adjacent thereto.

A communicating passage 18 formed in the side wall of the cylinder 1 establishes communication between the interior of the crankcase 13 and that of the head cover assembly 14 for guiding into the interior of the head cover 14 the blow-by gas B leaking into the crankcase 13 by way of the air gap G.

An air cleaner 21 disposed in the vicinity of an intake port 20 of the passage 2 purifies the air A sucked into the intake air passage 2 from the atmosphere.

The air cleaner 21 is accommodated within a downstream-side case member (i.e., case member disposed at a downstream side) 22 in which a rectifier 23 of a honeycomb structure is disposed at one end (outlet end) for uniformizing the flow of the intake air A.

Mounted within the intake air passage 2 at a position downstream of the flow rectifier 23 is a throttle valve 24 which is interlocked with an acceleration pedal (not shown) in case the engine system now of concern is installed in a motor vehicle. The throttle valve 24 is mounted rotatably around a bearing 24a, wherein the angular position of the throttle valve 24 changes in dependence on the stroke of depression of the acceleration pedal for thereby regulating or adjusting the amount of the intake air A to be charged into the cylinder 1.

The throttle valve 24 is held within a throttle body 25 which constitutes a part of the intake air passage 2. A surge tank 26 is formed within the intake air passage 2 at a location downstream of the throttle valve 24.

Further disposed within the intake air passage 2 at a position downstream of the rectifier 23 and upstream of the throttle valve 24 is a flow sensor 4, e.g. of a heat-sensitive type. The flow sensor 4 is designed to generate a detection signal indicative of the flow rate Q of the intake air flowing into the cylinder 1.

The flow sensor 4 includes a cylindrical member 40 for allowing the intake air A to flow therethrough, a sensor element 41 mounted within the cylindrical member 40, and a supporting or holding member 42 for holding fixedly the cylindrical member 40, wherein the sensor element 41 is disposed at a position substantially on the center or longitudinal axis of the intake air passage 2. The cylindrical member 40 is so oriented that the center axis thereof coincides with the direction in which the intake air A flows through the intake air passage 2. The sensor element 41 is constituted by a heat-sensitive resistance element (thermal resistance element) whose resistance value changes in dependence on the change of the temperature to be detected.

An electronic control unit (also referred to as the ECU in abbreviation) 5 which is constituted by a microcomputer performs optimal control of the fuel injection quantity by driving the injector 17 in conformance with the intake air flow rate Q. Parenthetically, the electronic control unit 5 is adapted to control various actuators provided in association with the internal combustion engine in accordance with the information concerning the operation of the engine as derived from outputs of various sensors, although they are not shown in the figure.

A recirculating passage 6 extends between the head cover assembly 14 and the surge tank 26 to constitute an intake passage portion located downstream of the throttle valve 24 for introducing the blow-by gas B into the surge tank 26 from the head cover assembly 14. Thus, feed-back or recirculation of the blow-by gas B is realized.

A metering valve 7 disposed in the recirculating passage 6 is designed to change the flow-sectional area of the recirculating passage 6 in dependence on the pressure difference taking place across the metering valve 7 to thereby regulate automatically the flow rate of the blow-by gas B. By the way, the pressure difference mentioned above changes in dependence on the operation states of the internal combustion engine.

An air recirculating passage 8 formed of rubber or the like material communicates the intake air passage 2a extending between the flow sensor 4 and the throttle valve 24 with the head cover assembly 14 for the purpose of introducing the recirculating air a from the interior of the intake air passage 2a into the head cover assembly 14.

An inlet port 80 of the recirculating air passage 8 is formed at one end of a suction member 81 constituted by a union pipe formed of a metal or resin and opened in the inner wall surface of the intake air passage 2a. The communicating passage 18, the recirculating passage 6 and the recirculating air passage 8 cooperate to constitute the positive crankcase ventilation system for recirculating or feeding back to the intake air passage 2 the blow-by gas B leaking from the cylinder 1 into the crankcase 13.

As is well known in the art, the positive crankcase ventilation system is provided for the purpose of purifying the exhaust gas E discharged from the internal combustion engine of a motor vehicle or the like. More specifically, the positive crankcase ventilation system serves for circulating the blow-by gas B leaking into the crankcase 13 through the air gap G formed between the piston 11 and the inner wall of the cylinder 1 to the intake air passage 2 to thereby feed the blow-by gas B again into the combustion process.

The reason whey the inlet port 80 of the recirculating air passage 8 is disposed at a location downstream of the flow sensor 4 can be explained by the fact that because the intake air flow rate Q detected by the flow sensor 4 contributes to increase the fuel injection quantity, the intake air flow Q containing the air flow a for recirculation has to be detected in order to control the air-fuel ratio with high accuracy.

Now, description will turn to operation of the conventional air intake system for the internal combustion engine shown in FIG. 27.

In the course of operation of the internal combustion engine, the blow-by gas B leaking from the combustion chamber 10 of the cylinder 1 into the crankcase 13 through the air gap G is introduced into the interior of the head cover assembly 14 by way of the communicating passage 18.

The blow-by gas B introduced into the head cover assembly 14 is then fed to the surge tank 26 of the intake air passage 2 through the recirculating passage 6 under the effect of the depression prevailing within the surge tank 26. In this manner, the blow-by gas B is finally introduced again into the combustion chamber 10 by way of the intake air passage 2 to undergo combustion.

In that case, because a part of the recirculating air a within the intake air passage 2a in which a pressure close to the atmospheric pressure prevails is fed into the interior of the head cover assembly 14 by way of the recirculating air passage 8, the blow-by gas B within the head cover assembly 14 can easily be forced to flow into the surge tank 26.

The metering valve 7 serves to automatically regulate the flow rate of the blow-by gas B in dependence on the engine operation state.

On the other hand, the flow sensor 4 measures the intake air flow rate Q of the intake air A passed through the air cleaner 21, wherein the detection output of the flow sensor 4 is supplied to the electronic control unit 5 as an input signal.

The electronic control unit 5 arithmetically determines the optimal amount or quantity of fuel to be charged into the cylinder 1 on the basis of the intake air flow rate Q as well as other information derived from other sensors, for thereby driving the injector 17 at a duty ratio conforming to the fuel quantity optimal for the current operation state of the engine.

In this conjunction, it is noted that because the flow sensor 4 is disposed at a location upstream of the inlet port 80 of the recirculating air passage 8, the intake air flow Q introduced ultimately into the cylinder 1 can be measured with high accuracy.

In recent years, there has arisen a demand for implementation of the air intake system as a whole in a reduced size (miniaturization) in order to utilize effectively the space for installation of the internal combustion engine and accessaries thereof as well as for the purpose of reducing the manufacturing cost. By way of example, such disposition is demanded in some case that can decrease the length of the intake air passage 2a extending between the flow sensor 4 and the throttle valve 24 to a possible minimum. This means that the distance between the flow sensor 4 and the inlet port 80 becomes extremely short.

However, when the distance between the flow sensor 4 and the inlet port 80 becomes short, as mentioned above, disturbance or turbulence may occur in the air stream within the intake air passage 2a under the influence of the recirculating air a introduced into the inlet port 80, providing difficulty for the flow sensor to measure the intake air flow rate Q with satisfactory accuracy.

In particular, the recirculating air a is introduced into the inlet port 80 in conformance with the stroke of the piston 11 moved reciprocatively within the cylinder 1. In other words, the recirculating air a introduced into the inlet port 80 assumes a pulsating flow, so to say, providing a major factor which affects the measured value of the intake air flow rate Q.

In addition, when the internal combustion engine operates under a high load with the throttle valve 24 being set at a large opening degree, the negative pressure or depression prevailing within the surge tank 26 becomes close to the atmospheric pressure, which may incur such unwanted situation in which the blow-by gas B carrying oil particles should be ejected from the inlet port 80 of the recirculating air passage 8 with the ordinary recirculation of the blow-by gas B through the recirculating passage 6 becoming ineffective.

In that case, when the distance between the flow sensor 4 and the inlet port 80 is short, as mentioned previously, the sensor element 41 of the flow sensor 4 will be stained or contaminated, as a result of which heat transfer from the sensor element 41 of the heat-sensitive sensor 4 to the intake air A will vary, making it difficult to measure the intake air flow rate Q with sufficiently high accuracy. In this conjunction, it is noted that in general the flow sensor 4 undergoes neither cleaning nor replacement maintenance on a periodical basis, the stained or contaminated state of the flow sensor 4 renders it impossible to control the internal combustion engine in a satisfactory manner.

As the measures to cope with the pulsation in the flow rate of the recirculating air a, it has been proposed to provide a buffer means in the association with the recirculating air passage 8, as is disclosed, for example, in the publication cited hereinbefore. It is however apparent that provision of such buffer means can not contribute to any satisfactory solution of the problems mentioned above.

As is apparent from the foregoing description, because the inlet port 80 of the recirculating air passage 8 is simply so formed as to open in the inner wall surface of the intake air passage 2a in the conventional air intake system for the internal combustion engine, the flow sensor 4 is likely to be affected by the stream of the recirculating air a flowing into the inlet port 80 when the distance between the flow sensor 4 and the inlet port 80 is decreased in an effort to implement the air intake system in a small size, thus giving rise to a problem that the intake air flow rate Q can not be measured with sufficiently high accuracy.

Furthermore, when the distance between the flow sensor 4 and the inlet port 80 is dimensioned short, the sensor element 41 of the flow sensor 4 will unavoidably be contaminated due to exposure to the blow-by gas B ejected from the inlet port 80 of the recirculating air passage 8 when the engine operates in the state where the throttle valve 24 is opened fully, involving further degradation in the detection accuracy of the intake air flow rate Q, giving rise to a serious disadvantage.

SUMMARY OF THE INVENTION

In the light of the state of the art described above, it is a general object of the present invention to provide an air intake system for an internal combustion engine which can solve satisfactorily the aforementioned problems or shortcomings of the conventional engine air intake system.

More specifically, it is an object of the present invention to provide an air intake system for an internal combustion engine in which the distance between a flow sensor and an inlet port of a recirculating air passage is designed to be short for implementing the air intake system in a reduced size, wherein deviation or turbulence of the air stream taking place in the vicinity of the flow sensor is suppressed while protecting the flow sensor against contamination upon backward or reverse injection of the blow-by gas from the recirculating air passage.

In view of the above and other objects which will become apparent as description proceeds, there is provided according to a general aspect of the present invention an air intake system for an internal combustion engine, which system includes an intake air passage for supplying air into a cylinder of an internal combustion engine, an air cleaner disposed in the intake air passage at a position near to an intake port of the intake air passage, a flow sensor disposed within the intake air passage at a position downstream of the air cleaner for detecting an intake air flow fed to the cylinder, a throttle valve disposed within the intake air passage at a position downstream of the flow sensor and adapted to be opened and closed for adjusting the intake air flow, and a positive crankcase ventilation means for recirculating a blow-by gas leaking into a crankcase connected to the cylinder backwardly into the intake air passage. The positive crankcase ventilation means mentioned above includes a communicating passage for communicating interior of the crankcase with that of a head cover assembly of the cylinder, a recirculating passage for introducing the blow-by gas from the head cover assembly into the intake air passage at a location downstream of the throttle valve, and a recirculating air passage for introducing recirculating air into the head cover assembly from the intake air passage at a location intermediate between the flow sensor and the throttle valve.

The recirculating air passage includes a suction member having one end portion disposed within the intake air passage, which suction member defines an air inlet passage having an inlet port provided in the above-mentioned one end portion at a downstream side relative to a center of that one end portion within the intake air passage.

By virtue of the arrangement of the air intake system described above, deviation or non-uniformity of the air stream which may take place in the vicinity of the flow sensor can be suppressed while the flow sensor can be protected against contamination which may otherwise be brought about by the blow-by gas upon injection thereof into the intake passage. Thus, even when the distance between the flow sensor and the inlet port for the recirculating air is dimensioned short, there can be implemented the intake system for the internal combustion engine which ensures high detection accuracy of the flow sensor without impairing the intrinsic function thereof.

In a preferred mode for carrying out the invention, the suction member of the recirculating air passage may include a pipe-like member projecting into the intake air passage and an inlet port formed in the vicinity of a tip end of the pipe-like member. The inlet port may be oriented in a downstream direction in which the air flows through the intake air passage.

By virtue of the arrangement mentioned above, deviation or turbulence possibly taking place in the air stream in the vicinity of the flow sensor can be suppressed satisfactorily even when the distance between the flow sensor and the inlet or intake port for the recirculating air is dimensioned short. Besides, contamination of the flow sensor upon injection of the blow-by gas from the circulating air passage can be suppressed. Thus, there can be realized the air intake system for the internal combustion engine in which the detection accuracy of the flow sensor is protected against degradation.

In another preferred mode for carrying out the invention, the suction member of the recirculating air passage may include a first pipe-like section projecting into the intake air passage, a second pipe-like section extending from one end of the first pipe-like section in the downstream direction within the intake air passage, and an inlet port provided in the vicinity of a tip end portion of the second pipe-like section.

With the arrangement described above, there can be realized the air intake system for the internal combustion engine which can ensure high detection accuracy and reliability of the flow sensor.

In yet another preferred mode for carrying out the invention, the flow sensor may be constituted by a heat-sensitive flow sensor.

By using the heat-sensitive flow sensor, the detection accuracy of the air flow rate can further be enhanced.

In still another preferred mode for carrying out the invention, the suction member of the recirculating air passage may be disposed such that at least a part thereof is covered by a shadow of a supporting member for the flow sensor as projected in the downstream direction.

Owing to the above arrangement, the detection accuracy of the flow sensor can further be protected against degradation due to deposition of contaminant thereon.

In a further preferred mode for carrying out the invention, the suction member of the recirculating air passage may be disposed at a position opposite to a supporting member for the flow sensor as viewed in a direction diametrically of the intake air passage.

By virtue of the feature mentioned above, there can furthermore be realized the air intake system for the internal combustion engine which can ensure higher detection accuracy of the flow sensor.

In yet further preferred mode for carrying out the invention, the suction member of the recirculating air passage may be disposed at a location in the vicinity of an inner wall of the intake air passage so as to increase the intrinsic flow cross-section of the intake air passage for thereby suppressing the fluid resistance components.

Thus, there can be realized the air intake system for the internal combustion engine which can ensure high detection accuracy of the flow sensor.

In still further preferred mode for carrying out the invention, the distance between the sensor element of the flow sensor and the inlet port of the recirculating air passage may be dimensioned to be greater than or equal to a half of an inner diameter of the intake air passage.

With the arrangement mentioned above, influence of variation occurring in the air flow rate at or in the vicinity of the inlet port can be suppressed more positively, whereby there can be realized the air intake system for the internal combustion engine which ensures high detection accuracy and reliability of the flow sensor.

In another preferred mode for carrying out the invention, at least a portion of the intake air passage which accommodates therein the flow sensor, the suction member of the recirculating air passage and the throttle valve may be so disposed that the flow sensor disposed at an upstream side assumes a position higher than a position at which the inlet port of the recirculating air passage is disposed at a downstream side relative to the flow sensor.

Owing to the arrangement mentioned above, contamination of the flow sensor brought about when the blow-by gas is ejected or discharged from the inlet port can thoroughly be prevented so that the air intake system for the internal combustion engine can be realized without impairing detection accuracy of the flow sensor.

In yet another preferred mode for carrying out the invention, the inlet port of the recirculating air passage may be so disposed as to face other portion of the throttle valve than a bearing thereof.

With this arrangement, influence of variation in the air flow rate at the inlet port can further be suppressed more positively, whereby there can be realized the air intake system for the internal combustion engine which ensures high detection accuracy and reliability of the flow sensor.

In still another preferred mode for carrying out the invention, the air intake system mentioned above may further include a throttle body constituting a part of the intake air passage and holing the throttle valve, wherein the suction member of the recirculating air passage may be implemented integrally with the throttle body.

With the structure mentioned above, a desired relative positional relation can be secured between the suction member and the throttle valve, whereby high freedom can be obtained in designing the air intake system for the engine.

In a further preferred mode for carrying out the invention, the suction member of the recirculating air passage may be implemented integrally with a conduit member which constitutes a part of the intake air passage.

Since the suction member is realized as a single unit together with the conduct member, high freedom can obtained in the design of the air intake system for the engine.

In yet further preferred mode for carrying out the invention, the suction member of the recirculating air passage may be implemented integrally with the flow sensor through the medium of the conduit member.

With the structure mentioned above, a desired relative positional relation can be secured between the suction member and the flow sensor, which leads to high freedom in the design of the air intake system for the engine.

In still further preferred mode for carrying out the invention, an inlet port side of the conduit member may be implemented integrally with a downstream-side case member of the air cleaner.

With the structure mentioned above, a desired relative positional relation can be secured between the suction member and the downstream-side case member which contributes to ensuring high freedom in the design of the air intake system for the engine.

In a preferred mode for carrying out the invention, the air intake system mentioned above further includes a flow sensor holding member constituting a part of the intake air passage and adapted to hold the flow sensor, and a throttle body constituting a part of the intake air passage and adapted to hold the throttle valve. The flow sensor holding member and the throttle body my be joined together by means of a securing member. The first pipe-like section may be so disposed as to project into the flow sensor holding member. The inlet port provided in the second pipe-like section may be disposed at a location downstream of the securing member.

With the arrangement described above, there can be realized the air intake system for the internal combustion engine which can not only achieve miniaturization but also ensure high detection accuracy and reliability of the flow sensor.

In another preferred mode for carrying out the invention, a part of the second pipe-like section may be so disposed as to partially overlap the flow sensor as viewed in a longitudinal direction.

With the arrangement described above, there can be realized the air intake system for the internal combustion engine which can also contribute to implementation thereof in a further reduced size.

In yet another preferred mode for carrying out the invention, the inlet port of the second pipe-like section has a flow cross-section elongated in a circumferential direction along an inner peripheral surface of the intake air passage.

With the above arrangement, the air intake system for the internal combustion engine can be realized in which lowering of the output of the internal combustion engine as well as degradation of detection accuracy of the flow sensor is prevented while fluid resistance components for the intake air flow and pressure loss in the intake air passage are further suppressed.

In still another preferred mode for carrying out the invention, an inner diameter of the second pipe-like section may be designed greater than that of the first pipe-like section.

With the arrangement described above, there can be realized the air intake system for the internal combustion engine which does not impair the intrinsic function of the positive crankcase ventilation system.

In a further preferred mode for carrying out the invention, the inlet port of the recirculating air passage may be opened in a direction differing from the downstream direction in which the intake air flows through the intake air passage.

Owing to the above arrangement, the detection accuracy of the flow sensor can further be protected against degradation due to deposition of contaminant thereon.

In yet further preferred mode for carrying out the invention, the inlet port of the recirculating air passage may be opened facing oppositely to an inner wall of the intake air passage.

With the above arrangement, the detection accuracy of the flow sensor can further be protected against degradation.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
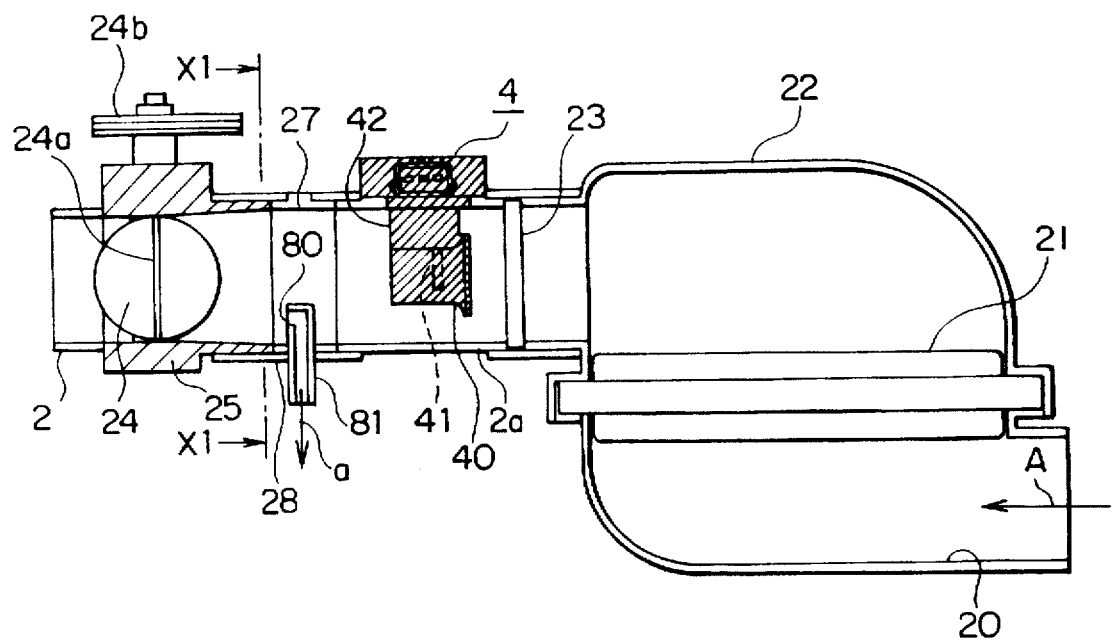
FIG. 1 is a side elevational sectional view showing a major portion of an air intake system for an internal combustion engine according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 2:
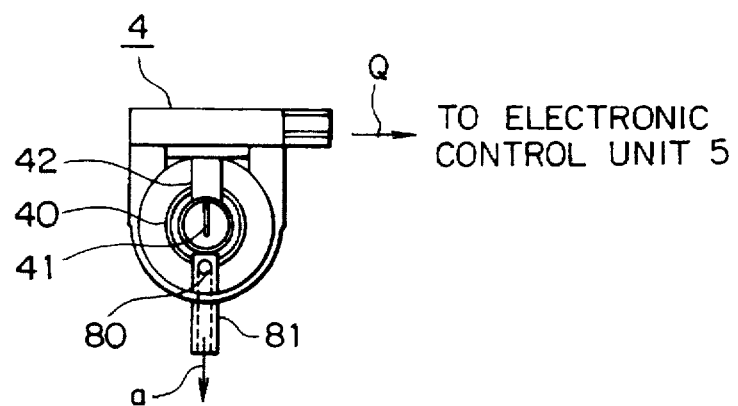
FIG. 2 is a sectional view of the same taken along a line X1—X1 shown in FIG. 1.
Figure 27:
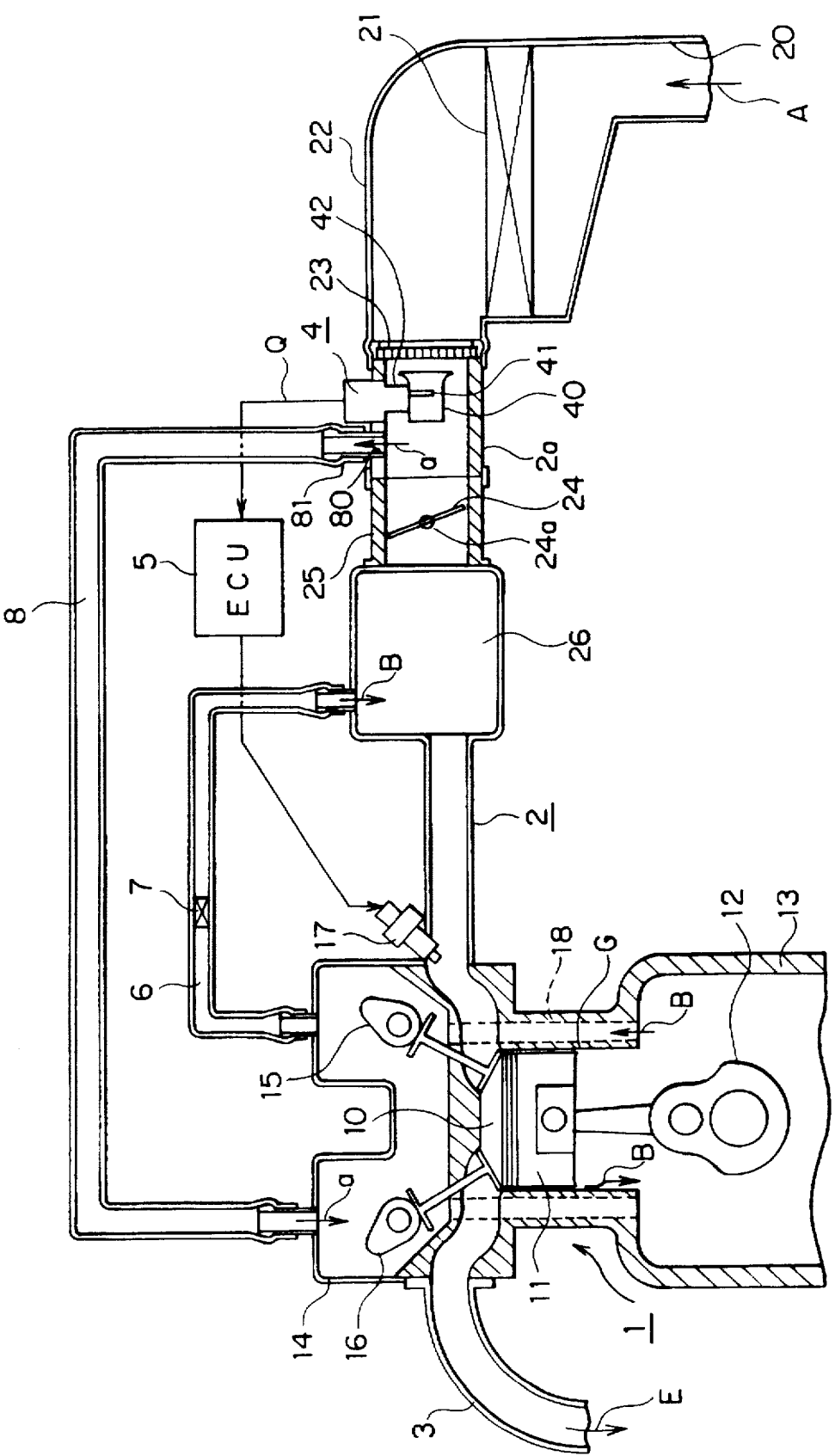
FIG. 27 is a structural diagram showing an intake system of an internal combustion engine equipped with a positive crankcase ventilation system known heretofore.

Description will be made of the air intake system for the internal combustion engine according to a first embodiment of the invention by reference to FIGS. 1 and 2, in which FIG. 1 is a side elevational sectional view showing a major portion of the air intake system according to the first embodiment of the invention, and FIG. 2 is a sectional view of the same taken along a line X1—X1 shown in FIG. 1. In the figures, the components same as or equivalent to those described hereinbefore (see FIG. 27) are denoted by like reference characters and repeated description thereof is omitted. Besides, the arrangement and components not shown in FIGS. 1 and 2 are similar to those shown in FIG. 27. Furthermore, the basic operations of the air intake system and the positive crankcase ventilation system are similar to those of the conventional systems described previously by reference to FIG. 27.

Now, referring to FIGS. 1 and 2, a bearing 24a of the throttle valve 24 is operatively connected to a throttle lever 24b which is interlinked with an acceleration pedal (not shown) so that the throttle valve 24 is rotationally driven in dependence on the depression stroke of the acceleration pedal by way of the throttle lever 24b.

The suction member 81 of the recirculating air passage 8 (see FIG. 27) is formed integrally with a conduit member 27 made of a metal or resin material and disposed at a location upstream of the throttle valve 24 in opposition to the supporting member 42 for the flow sensor 4 as viewed in the diametrical direction of the intake air passage 2a. The conduit member 27 is fitted fixedly onto a throttle body 25 by means of a securing member 28 and constitutes a part of the intake air passage 2a in cooperation with the throttle body 25.

The suction member 81 serving as an inlet passage for the recirculating air a may be pressure-welded to the conduit member 27 when the suction member 81 is made of a metal. Alternatively, the suction member 81 may be formed integrally with the conduit member 27 when the suction member 81 is made of a resin material.

In this conjunction, it is important to note that the suction member 81 is implemented in the form of a pipe-like member having one end portion secured at the conduit member 27 and projecting into the intake air passage 2a, wherein an inlet port 80 is formed in the vicinity of the tip end of the pipe-like member within the intake air passage 2a and that the inlet port 80 is opened at the downstream side of the pipe-like member constituting the suction member 81. In other words, the inlet port 80 is opened in the direction in which the intake air A flows through the intake air passage 2a.

By virtue of the arrangement that the inlet port 80 of the suction member 81 disposed downstream of the flow sensor 4 is positioned downstream of the flow sensor 4 and opened in the direction in which the intake air A flows within the intake air passage 2, as described above, the flow sensor 4 is protected against influence of a pressure wave of the air flow not only in the ordinary state in which a part of the recirculating air a flows into the inlet port 80 but also in the state in which the flow of the blow-by gas B takes place in the reverse direction through the recirculating air passage 8. Thus, the detection of the intake air flow rate Q with high accuracy can be ensured constantly.

It has been experimentally observed that the distance from the sensor element 41 of the flow sensor 4 to preferably the inlet port 80 of the recirculating air passage 8 should be selected greater than the inner radius (a half of inner diameter) of the intake air passage 2a inclusive, in order to protect the flow sensor 4 against the influence of the pressure wave of the recirculating air a.

Besides, the sensor element 41 of the flow sensor 4 can be prevented from contamination even when particles of oil are ejected from the inlet port 80 upon occurrence of reverse flow of the blow-by gas B through the recirculating air passage 8. Thus, the characteristics of the flow sensor 4 can remain substantially invariable over an extended period without suffering any appreciable drift, whereby accurate measurement of the intake air flow rate Q can be ensured over an extended time period.

Although the flow sensor 4 is not so designed as to measure the intake air flow rate Q over the whole cross-sectional area of the intake air passage 2a, deviation or deflection of the air flow A due to suction of the recirculating air a into the passage 8 through the inlet port 80 in the ordinary state can exert essentially no adverse influence to the intrinsic measuring function of the flow sensor 4. In other words, because of the disposition and the orientation of the inlet port 80 described above, the recirculating air a flowing into the passage 8 through the inlet port 80 can not affect adversely the uniform or laminar flow of the intake air A at the location of the flow sensor 4. More specifically, the recirculating air a caught by the inlet port 80 can not induce any appreciable deflection of the intake air A at the location of the flow sensor 4 such that the air tends to flow at a higher flow rate along the outer periphery of the cylindrical member 40. Thus, the intake air flow rate Q can be measured with high accuracy and reliability, even though the flow sensor 4 is not designed to measure the flow rate of the intake air A over the whole cross-sectional area of the intake air passage 2a.

In the case of the heat-sensitive flow sensor 4 whose sensor element 41 is constituted by a heating element or heat-sensitive element, the intake air flow rate Q is measured or detected on the basis of heat transfer rate to or from the intake air A, the fluid subjected to the measurement. When pulsation or deflection occurs in the air stream flowing in the periphery of the sensor element 41 or when the sensor element 41 is contaminated, error is involved in the detection of the intake air flow rate Q, degrading the detection accuracy. Thus, the advantageous effects elucidated above will become more significant when the sensor element 41 of the flow sensor 4 is constituted by the heating element or heat-sensitive element.

Additionally, when the suction member 81 is formed of a resin material integrally with the conduit member 27 which is jointed to the intake air passage 2a at the upstream and downstream sides, the suction member 81 can be implemented as a single unit, which in turn means that the manufacturing cost can be reduced while allowing high freedom in the design.

Furthermore, because the suction member 81 is disposed in opposition to the supporting member 42 of the flow sensor 4 as viewed in the diametrical direction of the intake air passage 2a, the cross-sectional profile of the intake air passage 2a projected onto the intake air A becomes symmetrical. In other words, effect of the fluid resistance components exerted by the supporting member 42 and the suction member 81 to the intake air A is symmetrical with reference to the diametrical direction in which the suction member 81 is disposed opposite to the supporting member 42. Thus, no deviation or non-uniformity can take place in the air flow along the periphery of the flow sensor 4 in spite of presence or absence of the recirculating air flow a, which also contributes to realization of higher accuracy capability detection of the intake air flow rate Q.

By way of example, let's assume that the suction member 81 is installed at a downstream position immediately after the flow sensor 4 as viewed in the flowing direction of the intake air A. In that case, the flow rate of the intake air A detected by the sensor element 41 will become lowered due to disturbance presented by the suction member 81, making it difficult or impossible to measure the flow rate with high sensitivity or accuracy.

Furthermore, when the suction member 81 is disposed in the close vicinity of the inner wall surface of the intake air passage 2a as viewed in the figure, fluid resistance component for the intake air A can be suppressed, whereby the intake air flow rate Q can be detected with more enhanced efficiency.

Additionally, it is generally noted that when if a pressure loss takes place within the intake air passage 2a due to fluid resistance components, the intake air quantity is restricted even when the throttle valve 24 is opened, incurring lowering of the output power (horse power) of the internal combustion engine. However, because of the disposition of the suction member 81 closely adjacent to the inner wall of the intake air passage 2a, the pressure loss in the air intake system can be suppressed, whereby lowering of the output power of the internal combustion engine can be suppressed to a minimum.

Embodiment 2

In the case of the air intake system according to the first embodiment of the invention, the suction member 81 of the recirculating air passage 8 is formed only by a single pipe-like member of a linear shape. However, an additional pipe-like member which is so bent as to extend in the downstream direction may be provided in combination with the suction member 81.

Figure 3:
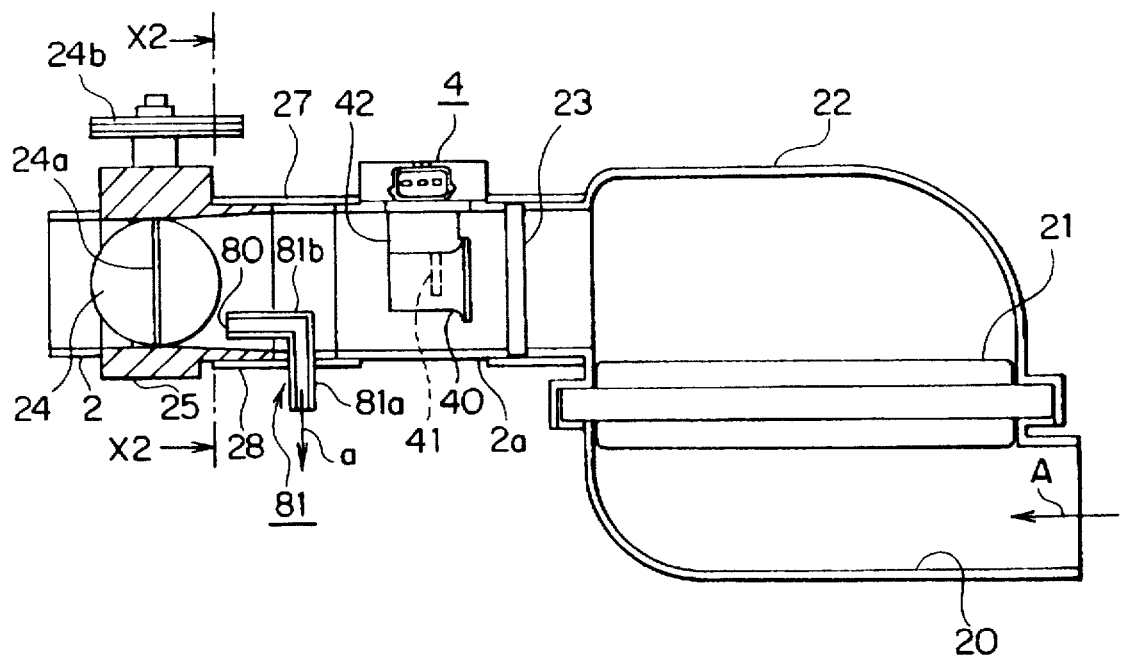
FIG. 3 is a side elevational sectional view showing a major portion of an air intake system according to a second embodiment of the invention.
Figure 4:
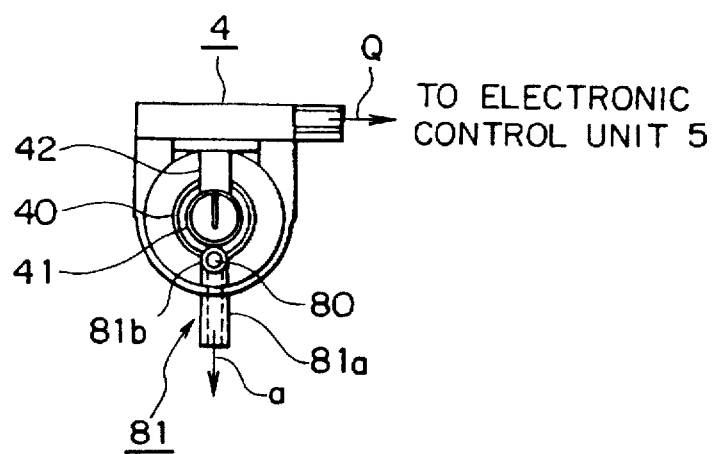
FIG. 4 is a sectional view of the same taken along a line X2—X2 shown in FIG. 3.

FIG. 3 is a side elevational sectional view showing a major portion of the air intake system according to a second embodiment of the invention, and FIG. 4 is a sectional view of the same taken along a line X2—X2 shown in FIG. 3.

In the figures, the components same as or equivalent to those described hereinbefore are denoted by like reference characters and repeated description thereof is omitted. Further, the arrangement and components not shown in FIGS. 3 and 4 are similar to those shown in FIG. 27. Furthermore, the basic operations of the air intake system and the positive crankcase ventilation system are similar to those of the conventional apparatuses described previously by reference to FIG. 27.

Referring to FIG. 3, the suction member 81 of the recirculating air passage 8 is constituted by a first pipe-like section 81a which projects into the intake air passage 2a and a second pipe-like section 81b which extends from one end of the first pipe-like section 81a in the downstream direction within the intake air passage 2a, wherein the inlet port 80 is formed in the vicinity of the tip or free end of the second pipe-like section 81b, and the inlet port 80 is so oriented as to face in opposition to the throttle valve 24 disposed downstream within the intake air passage 2a.

With the structure described above, the distance from the flow sensor 4 to the inlet port 80 of the recirculating air passage 8 is increased by an extent corresponding to the length of the second pipe-like section 81b. Thus, the influence of the recirculating air a flowing into the recirculating air passage 8 through the suction member 81 or that of the reverse flow of the blow-by gas B exerted to the flow sensor 4 can be suppressed more positively when compared with the arrangement described hereinbefore in conjunction with the first embodiment of the invention, which means equivalently that the detection of the intake air flow rate Q can be accomplished with enhanced accuracy.

In addition, with the structure shown in FIG. 3, even when the blow-by gas B is ejected reversely from the recirculating air passage 8 through the inlet port 80, the sensor element 41 of the flow sensor 4 can be positively protected against contamination, while turbulence or deflection of the recirculating air a introduced into the inlet port 80 in the ordinary state can exert any appreciable adverse influence to the flow rate of the intake air A detected by the flow sensor 4, whereby the intake air flow rate Q can be measured with enhanced accuracy.

Additionally, because the suction member 81 of the recirculating air passage 8 is disposed in opposition to (or symmetrically to) the supporting member 42 of the flow sensor 4 as viewed in the diametrical direction of the intake air passage 2, disturbance or nonuniformity in the air stream flowing through and around the flow sensor 4 can be suppressed, which also contributes to the high-accuracy detection of the intake air flow rate Q.

Embodiment 3

In the case of the second and third embodiments of the invention, the suction member 81 of the recirculating air passage 8 is disposed at a position opposite to the supporting member 42 of the flow sensor 4 as viewed in the direction diametrically of the intake air passage 2a. However, such arrangement can equally be adopted in which the recirculating air passage 8 and the suction member 81 are so disposed that at least a part of the suction member 81 is positioned on a plane covered by a shadow of the supporting member 42 projected in the direction downstream thereof along the longitudinal axis of the intake air passage 2a.

Figure 5:
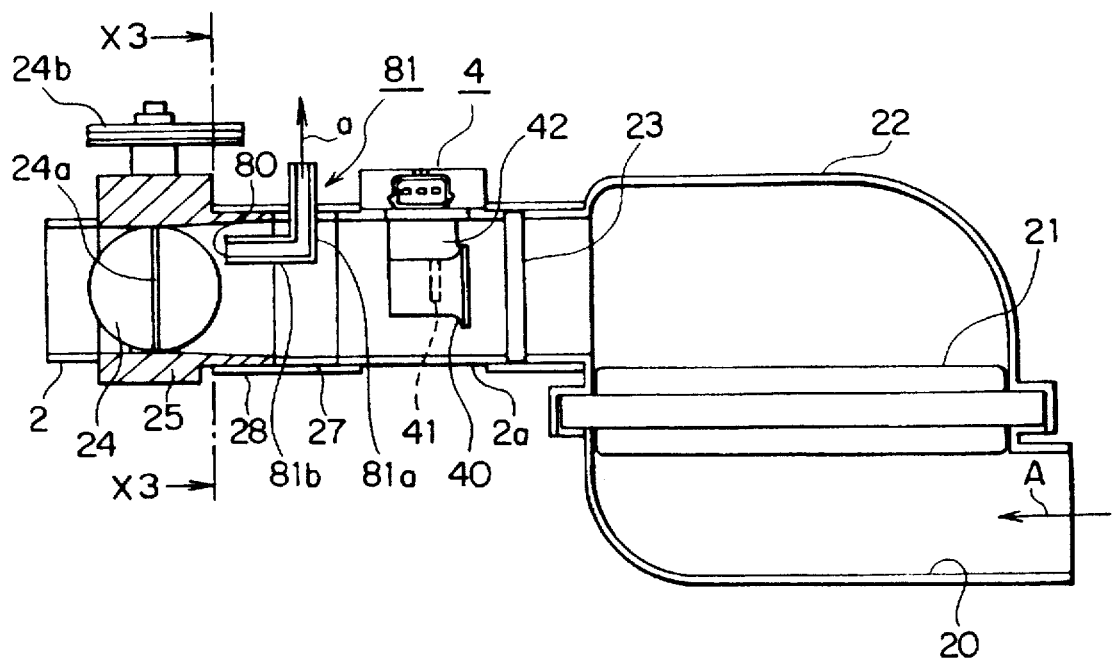
FIG. 5 is a side elevational sectional view showing a major portion of an air intake system according to a third embodiment of the invention.
Figure 6:
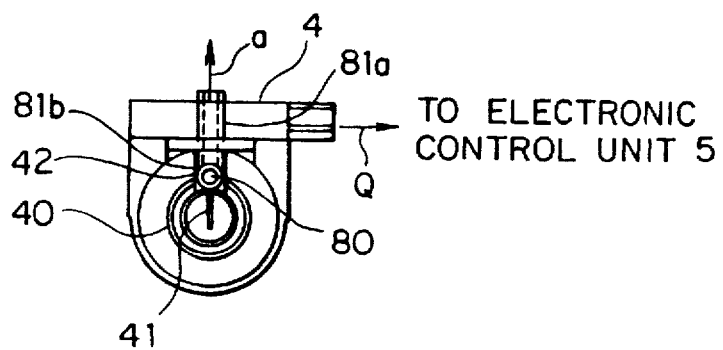
FIG. 6 is a sectional view of the same taken along a line X3—X3 shown in FIG. 5.

FIG. 5 is a side elevational sectional view showing a major portion of the air intake system according to a third embodiment of the invention, and FIG. 6 is a sectional view of the same taken along a line X3—X3 shown in FIG. 5.

In the figures, the components same as or equivalent to those described hereinbefore are denoted by like reference characters and repeated description thereof is omitted. Further, the arrangement and components not shown in FIGS. 5 and 6 are similar to those shown in FIG. 27. Furthermore, the basic operations of the air intake system and the positive crankcase ventilation system are similar to those of the conventional systems described hereinbefore by reference to FIG. 27.

Namely, referring to FIG. 5 together with FIG. 6, it can be seen that at least a part of the suction member 81 of the recirculating air passage 8 is disposed on a plane covered by a shadow of the supporting member 42 of the flow sensor 4 as projected in the downstream direction along the longitudinal axis of the intake air passage 2a so that at least a part of the suction member 81 overlaps with the supporting member 42 of the flow sensor 4 as viewed in the direction in which the intake air A flows. To say in another way, at least a part of the suction member 81 of the recirculating air passage 8 is positioned within a projection of the supporting member 42 of the flow sensor 4 as viewed in the flow direction of the intake air A. Parenthetically, an imaginary plane on which the shadow of the supporting member 42 is projected is referred to as the plane of projection of the supporting member 42.

In that case, when the suction member 81 is designed in a large size, a part or parts of the suction member 81 may be located outside of the plane of projection of the supporting member 42. By contrast, when the suction member 81 is designed thin, the whole body of the suction member 81 lies on the plane of projection of the supporting member 42 of the flow sensor 4 disposed upstream of the suction member 81.

By virtue of the above-mentioned arrangement, the intake air passage 2a can be so designed as to be imparted with a large flow cross-sectional area, which is advantageous in that the fluid resistance components acting on the intake air A can be decreased and thus the pressure loss within the intake air passage 2a can be suppressed to a minimum, whereby the detection of the intake air flow rate Q by means of the flow sensor 4 can be preformed with high efficiency while preventing the power output of the internal combustion engine from lowering.

Embodiment 4

In the case of the air intake systems described above in conjunction with the first to third embodiments, the section or portion of the intake air passage 2a which accommodates therein the flow sensor 4, the suction member 81 of the recirculating air passage 8 and the throttle valve 24 is disposed horizontally. However, this portion of the intake air passage 2a may be disposed in a vertical orientation.

Figure 7:
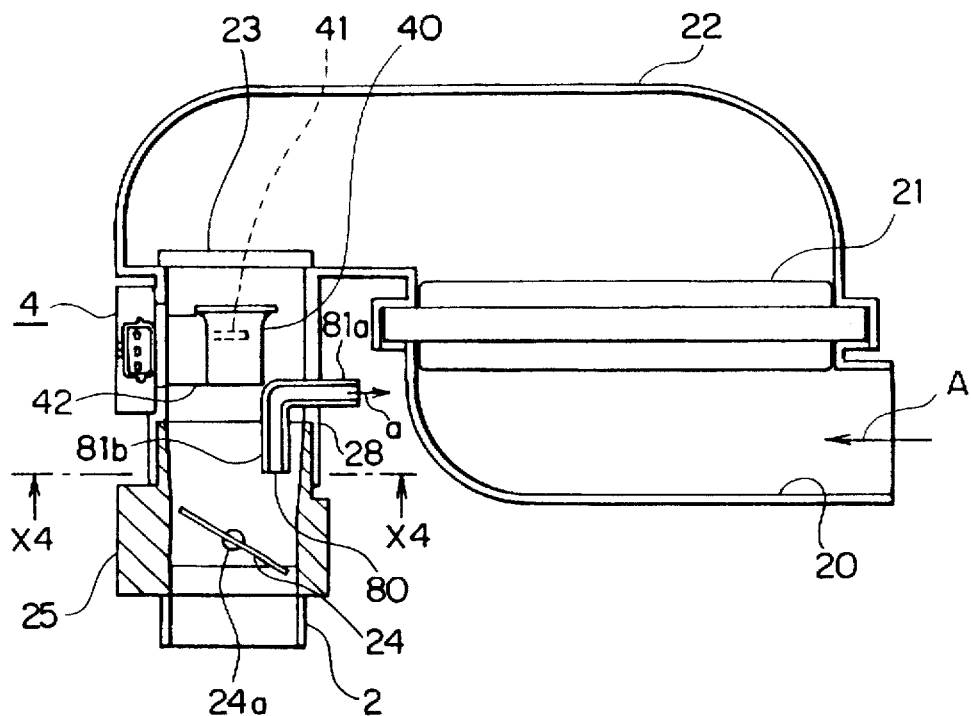
FIG. 7 is a side elevational sectional view showing a major portion of an air intake system according to a fourth embodiment of the invention.
Figure 8:
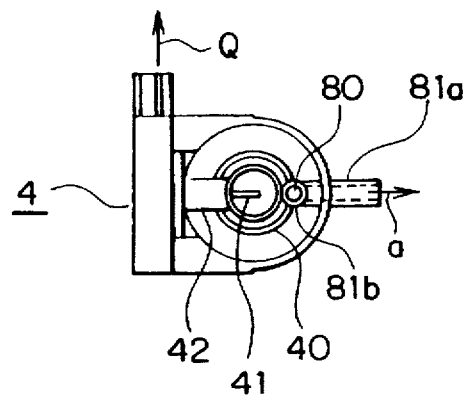
FIG. 8 is a sectional view of the same taken along a line X4—X4 shown in FIG. 7.

FIG. 7 is a side elevational sectional view showing a major portion of the air intake system according to a fourth embodiment of the invention, and FIG. 8 is a sectional view of the same taken along a line X4–X4 shown in FIG. 7.

In the figures, the components same as or equivalent to those described hereinbefore are denoted by like reference characters and repeated description thereof is omitted. Further, the arrangement as well as the components not shown in FIGS. 7 and 8 are similar to those shown in FIG. 27. Furthermore, the basic operations of the air intake system and the positive crankcase ventilation system are similar to those of the conventional systems described previously by reference to FIG. 27.

Referring to FIGS. 7 and 8, the section of the intake air passage 2a which accommodates therein the flow sensor 4, the suction member 81 and the throttle valve 24 is disposed vertically, i.e., in an upstanding attitude, wherein the flow sensor 4 positioned upstream as viewed in the flow direction of the intake air A is disposed at a location or level higher than a location where the inlet port 80 of the suction member 81 is disposed downstream of the flow sensor 4.

The structure of the above-mentioned air intake system is advantageous in that even when the reverse flow of the blow-by gas B is ejected from the inlet port 80 with droplets of oil particles carried by the blow-by gas B, the sensor element 41 of the flow sensor 4 can be protected from contamination by the oil or other contaminants in a very satisfactory manner.

Embodiment 5

In the air intake systems according to the first to fourth embodiments, no description has been made particularly of the orientation of the inlet port 80 of the recirculating air passage 8 relative to the throttle valve 24. In this conjunction, the inlet port 80 of the recirculating air passage 8 may be so disposed as to face other portion of the throttle valve 24 than the bearing 24a therefor.

Figure 9:
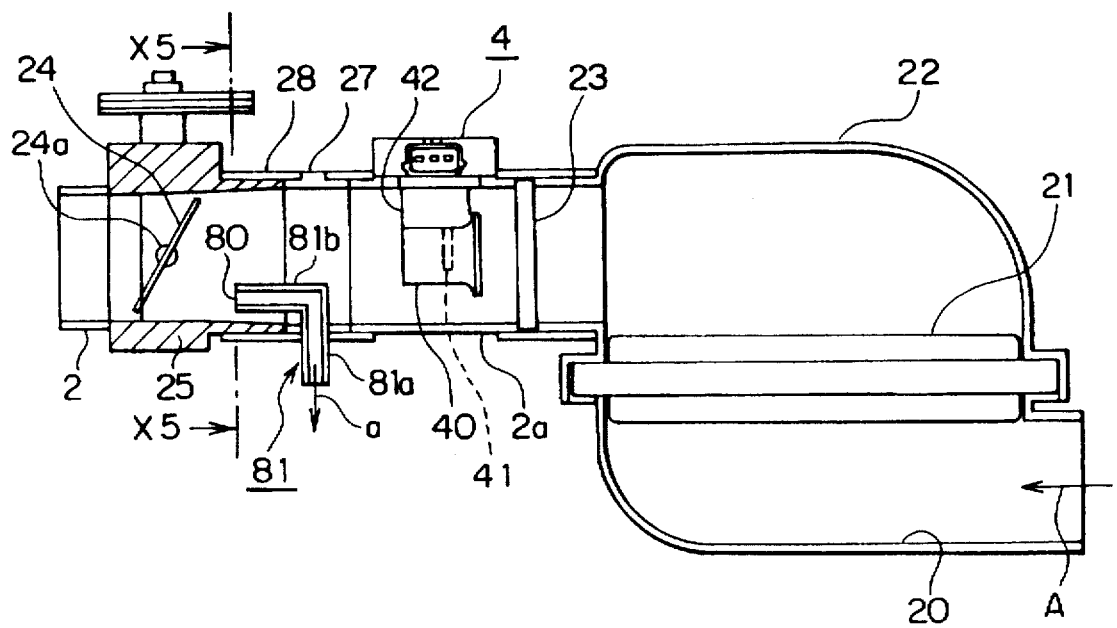
FIG. 9 is a side elevational sectional view showing a major portion of an air intake system according to a fifth embodiment of the invention.
Figure 10:
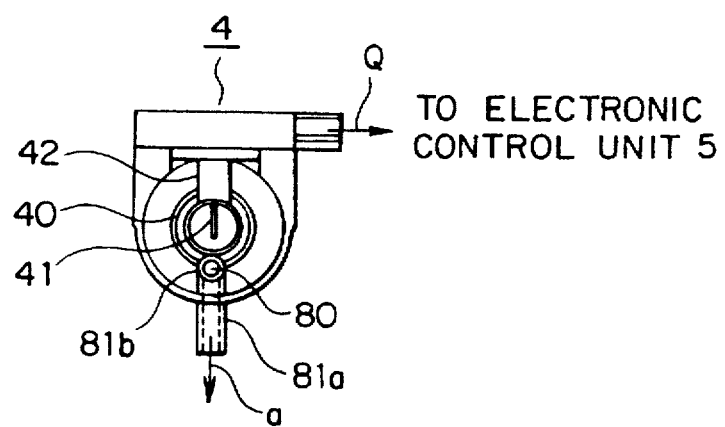
FIG. 10 is a sectional view of the same taken along a line X5—X5 shown in FIG. 9.

FIG. 9 is a side elevational sectional view showing a major portion of the air intake system according to a fifth embodiment of the invention, and FIG. 10 is a sectional view of the same taken along a line X5—X5 shown in FIG. 9.

In the figures, the components same as or equivalent to those described hereinbefore are denoted by like reference characters and repeated description thereof is omitted. Further, the arrangement as well as the components not shown in FIGS. 9 and 10 are similar to those shown in FIG. 27. Furthermore, the basic operations of the air intake system and the positive crankcase ventilation system are similar to those of the conventional systems described previously by reference to FIG. 27.

Referring to FIGS. 9 and 10, the inlet port 80 of the recirculating air passage 8 is so disposed as to face in opposite to other portion of the throttle valve 24 than the bearing 24a.

By virtue of the arrangement mentioned above, the bearing 24a can be protected from contamination by oil and/or sludge particles carried by the blow-by gas B ejected from the inlet port 80.

Additionally, the structure according to the instant embodiment of the invention can ensure that the bearing 24a is prevented from being frozen due to deposition of steam or moisture contained in the blow-by gas B.

Thus, high reliability can be ensured for the operation of the throttle valve 24 and hence for the operation of the air intake system of the internal combustion engine.

Embodiment 6

In the air intake systems according to the first to fifth embodiments, the conduit member 27 for holding the suction member 81 of the recirculating air passage 8 is implemented as a member separately or discretely from the throttle body 25. However, the suction member 81 may be realized in a structure integral with the throttle body 25.

Figure 11:
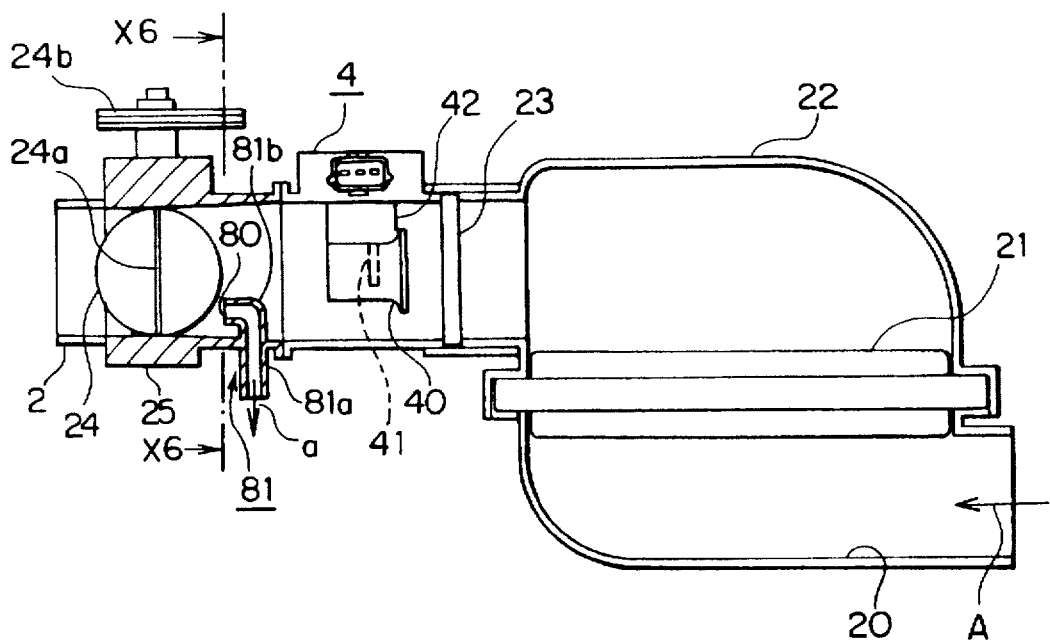
FIG. 11 is a side elevational sectional view showing a major portion of an air intake system according to a sixth embodiment of the invention.
Figure 12:
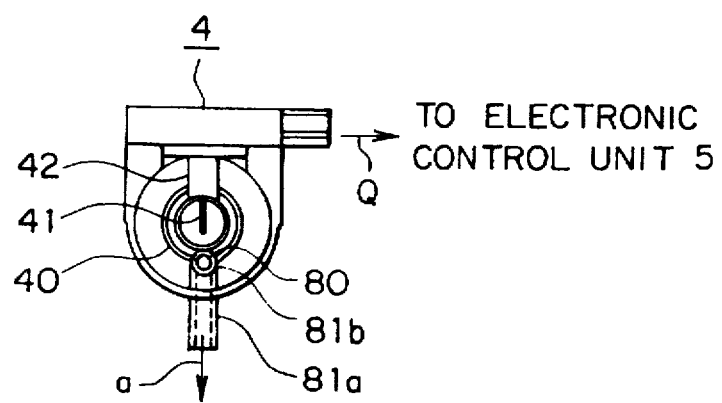
FIG. 12 is a sectional view of the same taken along a line X6—X6 shown in FIG. 11.

FIG. 11 is a side elevational sectional view showing a major portion of the air intake system according to a sixth embodiment of the invention, and FIG. 12 is a sectional view of the same taken along a line X6—X6 shown in FIG. 11.

In the figures, the components same as or equivalent to those described hereinbefore are denoted by like reference characters and repeated description thereof is omitted. Further, the arrangement as well as the components not shown in FIGS. 11 and 12 are similar to those shown in FIG. 27. Furthermore, the basic operations of the air intake system and the positive crankcase ventilation system are similar to those of the conventional systems described hereinbefore by reference to FIG. 27.

Referring to FIGS. 11 and 12, the suction member 81 of the recirculating air passage 8 may be formed of e.g. aluminum integrally with the throttle body 25 by resorting to a casting technique. Because relatively high strength is demanded for the throttle body 25 in order to ensure the open/close operation of the throttle valve 24 with high accuracy and reliability, it is preferred to form the throttle body 25 integrally with the suction member 81 of the recirculating air passage 8 from aluminum by die casting method.

With the structure described above, the relative positional relation between the throttle valve 24 and the inlet port 80 of the recirculating air passage 8 can be realized precisely so as to conform with the design requirement. Thus, no limitation can be imposed to the design of peripheral parts, which means that high freedom can be ensured in the design.

Embodiment 7

In the air intake system according to the sixth embodiment, the suction member 81 of the recirculating air passage 8 is implemented integrally with the throttle body 25. Alternatively, the suction member 81 may be implemented in a structure integral with the flow sensor 4.

Figure 13:
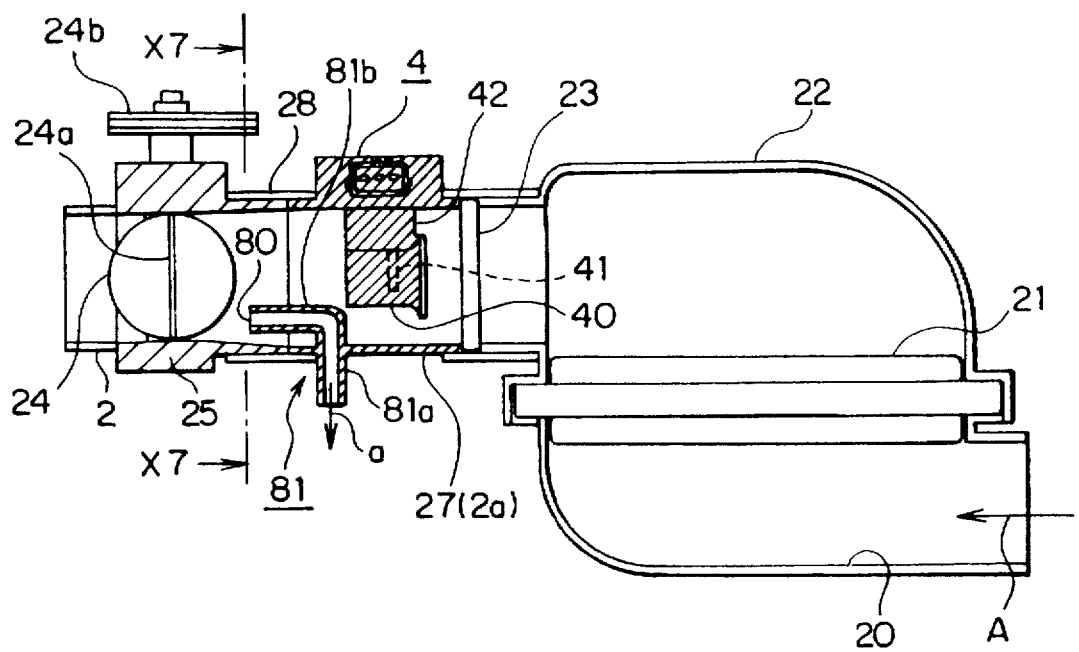
FIG. 13 is a side elevational sectional view showing a major portion of an air intake system according to a seventh embodiment of the invention.
Figure 14:
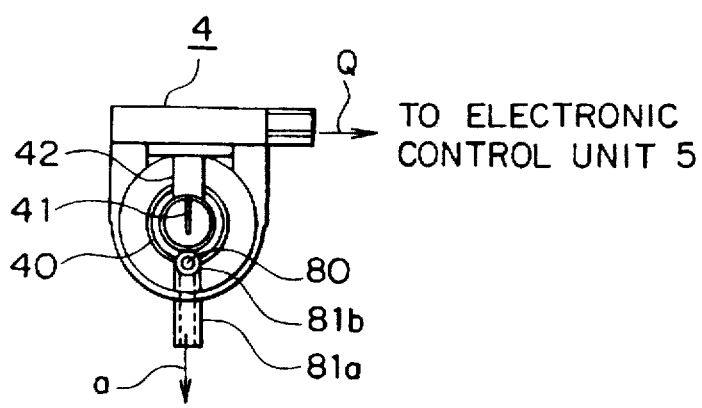
FIG. 14 is a sectional view of the same taken along a line X7—X7 shown in FIG. 13.

FIG. 13 is a side elevational sectional view showing a major portion of the air intake system according to a seventh embodiment of the invention, and FIG. 14 is a sectional view of the same taken along a line X7—X7 shown in FIG. 13.

In the figures, the components same as or equivalent to those described hereinbefore are denoted by like reference characters and repeated description thereof is omitted. Further, the arrangement as well as the components not shown in FIGS. 13 and 14 are similar to those shown in FIG. 27. Furthermore, the basic operations of the air intake system and the positive crankcase ventilation system are similar to those of the conventional systems described hereinbefore by reference to FIG. 27.

Referring to FIGS. 13 and 14, the conduit member 27 constituting a part of the intake air passage 2a and holing the suction member 81 of the recirculating air passage 8 serves also as a flow sensor holder for holding the flow sensor 4, wherein the suction member 81 and the flow sensor 4 are formed in integral combination with each other.

The suction member 81, the conduit member 27 and the flow sensor 4 can be implemented in an integral structure by resorting to e.g. a resin molding technique, wherein the first pipe-like section 81a of the suction member 81 is so disposed as to project into the conduit member 27 (flow sensor holder).

The conduit member 27 serving also as the holder for the flow sensor 4 is joined to the throttle body 25 by means of the securing member 28. When the suction member 81 is made in an L-like shape, as shown in FIG. 3, the inlet port 80 formed in the vicinity of the tip end of the second pipe-like section 81b is disposed at a position closely adjacent to the securing member 28 and (or) at the downstream side thereof.

With the structure described above, the relative positional relation between the flow sensor 4 and the inlet port 80 can be realized so as to meet precisely the design requirements. Thus, no limitation is imposed to the design of peripheral parts, which means that high freedom can be assured in designing.

When the suction member 81 is of an L-like form (see FIG. 3), the relative positional relation as designed can be ensured between the throttle body 25 and the securing member 28 as well.

Embodiment 8

In the case of the air intake system according to the seventh embodiment, the suction member 81 of the recirculating air passage 8 is formed integrally with the flow sensor 4. However, the suction member 81 may be implemented in a structure integral with the downstream-side case member 22 of the air cleaner 21.

Figure 15:
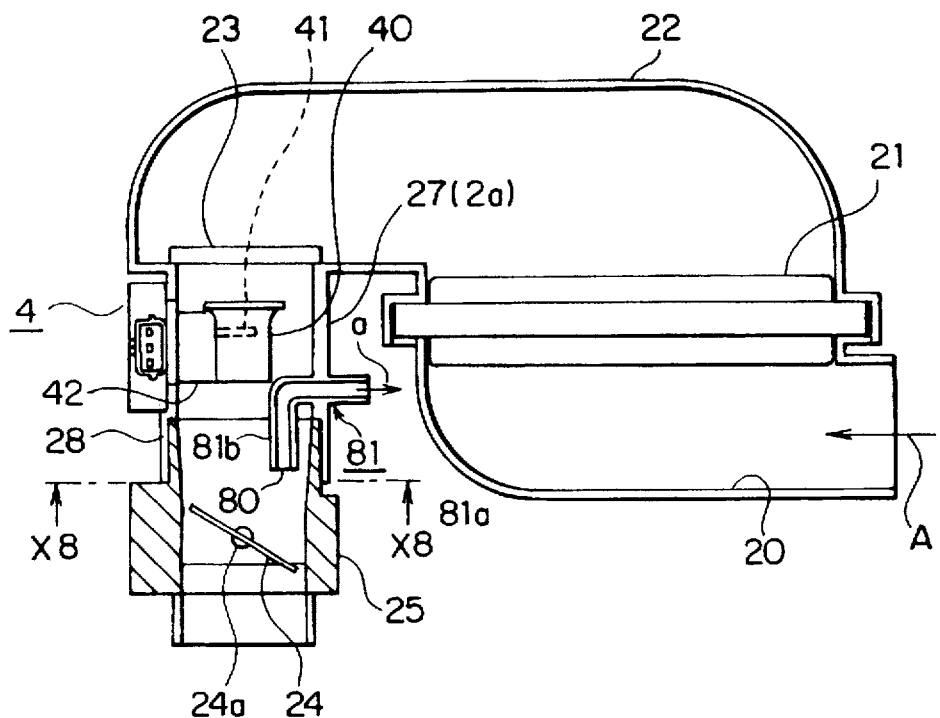
FIG. 15 is a side elevational sectional view showing a major portion of an air intake system according to an eighth embodiment of the invention.
Figure 16:
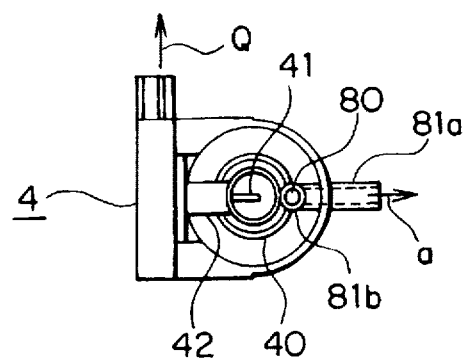
FIG. 16 is a sectional view of the same taken along a line X8—X8 shown in FIG. 15.

FIG. 15 is a side elevational sectional view showing a major portion of the air intake system according to an eighth embodiment of the invention, and FIG. 16 is a sectional view of the same taken along a line X8—X8 shown in FIG. 15.

In the figures, the components same as or equivalent to those described hereinbefore are denoted by like reference characters and repeated description thereof is omitted. Further, the arrangement as well as the components not shown in FIGS. 15 and 16 are similar to those shown in FIG. 27. Furthermore, the basic operations of the air intake system and the positive crankcase ventilation system are similar to those of the conventional systems described hereinbefore by reference to FIG. 27.

Referring to FIGS. 15 and 16, an inlet port portion of the conduit member 27 is formed integrally with a downstream-side case member 22 of the air cleaner 21 (i.e., a case member of the air cleaner disposed at the downstream side). The suction member 81 of the recirculating air passage 8 is also formed of a resin material in an integral structure with the conduit member 27 and the downstream-side case member 22.

The flow sensor 4 may be disposed within the conduit member 27 and secured thereto integrally by using screws or the like (not shown).

With the structure described above, the relative positional relationship between the flow sensor 4 and the rectifier 23 can be realized precisely in conformance with the design requirements. Thus, no limitation is imposed to the design of peripheral parts, which means that high freedom can be assured in designing.

The strength required for the holder of the flow sensor 4 as well as for the inlet port portion for the intake air A is relatively low. Thus, they can easily be realized in an integral structure by resorting to a resin molding, which is profitable in that the cost involved in assembling of the air intake system can further be reduced.

In the foregoing description directed to the third to eighth embodiments, it has been assumed that the suction member 81 is composed of the first pipe-like section 81a and the second pipe-like section 81b. However, this is only for the purpose of illustration. It goes without saying that teachings of the invention incarnated in the embodiments described in the foregoing may equally be applied to the structure where the suction member 81 is constituted only by a single pipe-like member.

Embodiment 9

In the case of the air intake systems according to the second to eighth embodiments of the invention described above, the suction member 81 of the recirculating air passage 8 is disposed at a position downstream of the flow sensor 4 with a certain distance therefrom. However, in the case where the second pipe-like section 81b is used, it may be so disposed as to partially overlap the downstream projection of the supporting member 42 of the flow sensor 4 (i.e., the second pipe-like section 81b can be partially located beneath the supporting member 42 within the intake air passage 2a.

Figure 17:
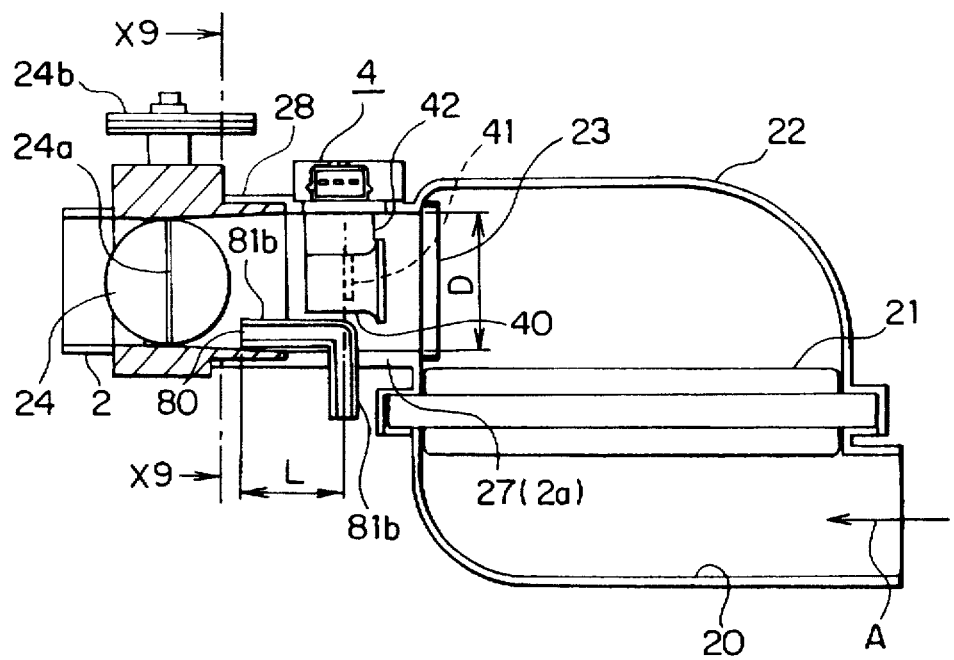
FIG. 17 is a side elevational sectional view showing a major portion of an air intake system according to a ninth embodiment of the invention.
Figure 18:
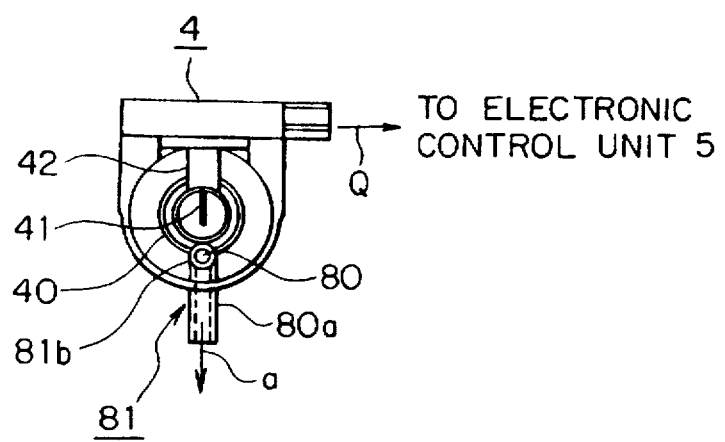
FIG. 18 is a sectional view of the same taken along a line X9—X9 shown in FIG. 17.

FIG. 17 is a side elevational sectional view showing a major portion of the air intake system according to a ninth embodiment of the invention, and FIG. 18 is a sectional view of the same taken along a line X9—X9 shown in FIG. 17.

In the figures, the components same as or equivalent to those described hereinbefore are denoted by like reference characters and repeated description thereof is omitted. Further, the arrangement and the components which are omitted from illustration in FIGS. 17 and 18 are similar to those shown in FIG. 27. Furthermore, the basic operations of the air intake system and the positive crankcase ventilation system are similar to those of the conventional systems described previously by reference to FIG. 27.

Referring to FIGS. 17 and 18, a part or portion of the second pipe-like section 81b of the suction member 81 is so disposed as to overlap with the flow sensor 4.

With a view to achieving the aimed object for suppressing the influence of the air stream in the inlet port 80, the distance L between the sensor element 41 of the flow sensor 4 and the inlet port 80 of the recirculating air passage 8 is so selected as to be greater than or at least equal to the inner radius (a half of the inner diameter D) of the intake air passage 2a.

By virtue of the arrangement that the suction member 81 is located at the side downstream of the flow sensor 4, there arises no need for making providing a space in the direction lengthwise of the intake air passage 2a, whereby the air intake system as a whole can be implemented in a reduced size.

Embodiment 10

In the case of the air intake systems according to the second to ninth embodiments of the invention described above, the cross-sectional shape of the inlet port 80 of the recirculating air passage 8 is designed in the form of a circle. However, when the second pipe-like section 81b is used, the cross-sectional shape of the inlet port 80 may be formed flat or oblong so as to extend along the inner peripheral surface of the intake air passage 2a.

Figure 19:
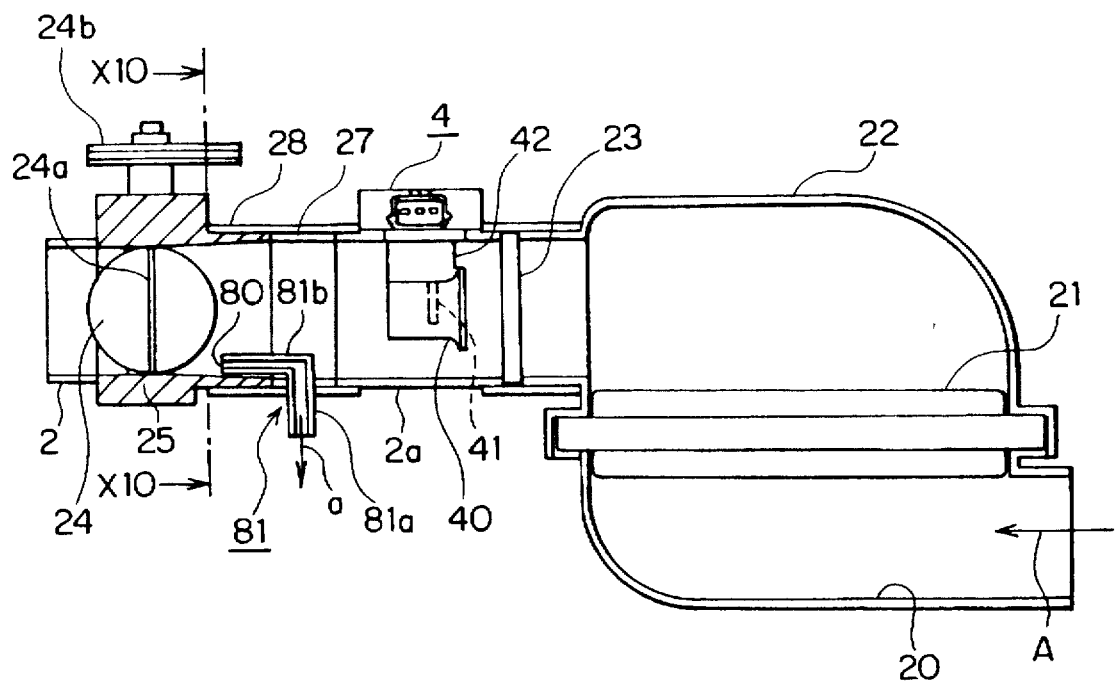
FIG. 19 is a side elevational sectional view showing a major portion of an air intake system according to a tenth embodiment of the invention.
Figure 20:
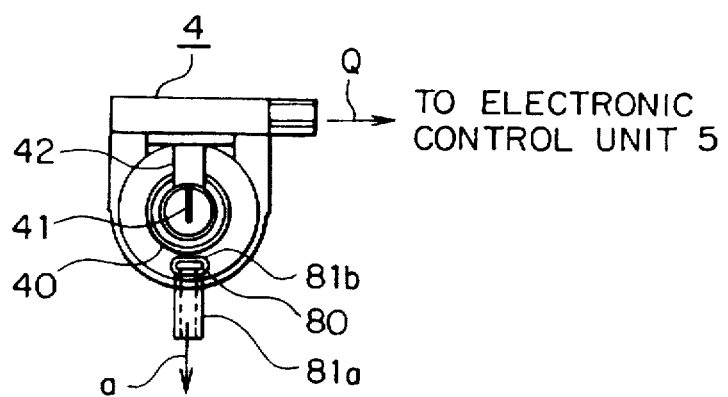
FIG. 20 is a sectional view of the same taken along a line X10—X10 shown in FIG. 19.

FIG. 19 is a side elevational sectional view showing a major portion of the air intake system according to a tenth embodiment of the invention, and FIG. 20 is a sectional view of the same taken along a line X10—X10 shown in FIG. 19.

In the figures, the components same as or equivalent to those described hereinbefore are denoted by like reference characters and repeated description thereof is omitted. Further, the arrangement and the components not shown in FIGS. 19 and 20 are similar to those shown in FIG. 27. Furthermore, the basic operations of the air intake system and the positive crankcase ventilation system are similar to those of the conventional systems described hereinbefore by reference to FIG. 27.

Referring to FIGS. 19 and 20, it can be seen that the inlet port 80 has a cross-sectional shape collapsed or flattened oblong along the inner peripheral surface of the intake air passage 2a, as can be seen in FIG. 20.

Owing to the arrangement mentioned above, the inlet port 80 can be disposed closely to the inner wall surface of the intake air passage 2a with the height of the suction member 81 from the inner wall surface of the intake air passage 2a being considerably decreased. This means that the suction member 81 is disposed at a location close to the inner wall surface of the intake air passage 2a where the flow rate of the intake air A is low, whereby the fluid resistance components for the intake air A can further be suppressed.

Embodiment 11

In the air intake systems for the internal combustion engine according to the second to ninth embodiments of the invention, the suction member 81 of the recirculating air passage 8 is so formed as to have a constant inner diameter. However, when the second pipe-like section 81b is used, the inner diameter of the second pipe-like section 81b may be designed greater than that of the first pipe-like section 81a.

Figure 21:
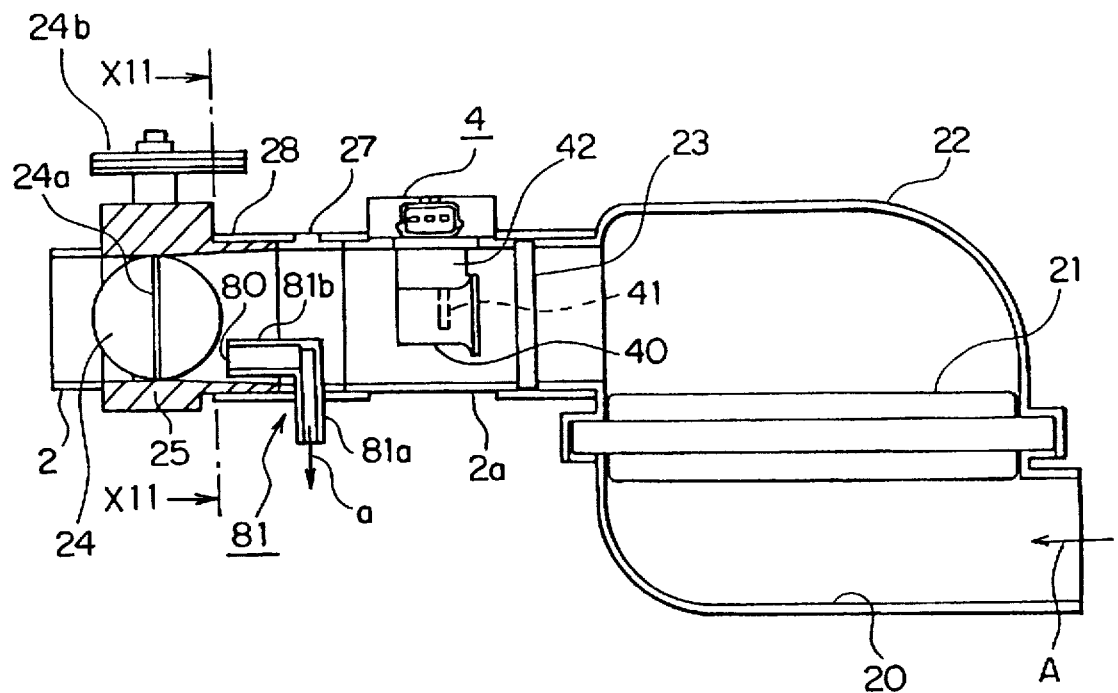
FIG. 21 is a side elevational sectional view showing a major portion of an air intake system according to an eleventh embodiment of the invention.
Figure 22:
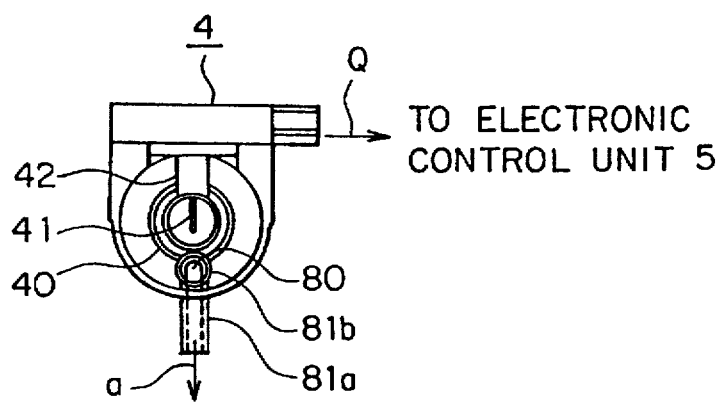
FIG. 22 is a sectional view of the same taken along a line X11—X11 shown in FIG. 21.

FIG. 21 is a side elevational sectional view showing a major portion of the air intake system according to an eleventh embodiment of the invention, and FIG. 22 is a sectional view of the same taken along a line X11—X11 shown in FIG. 21.

In the figures, the components same as or equivalent to those described hereinbefore are denoted by like reference characters and repeated description thereof is omitted. Further, the arrangement as well as the components not shown in FIGS. 21 and 22 are similar to those described hereinbefore by reference to FIG. 27. Furthermore, the basic operations of the air intake system and the positive crankcase ventilation system are similar to those of the conventional systems also described previously by reference to FIG. 27.

Referring to FIGS. 21 and 22, the second pipe-like section 81b has an inner diameter greater than that of the first pipe-like section 81a. By virtue of this arrangement, the blow-by gas B containing oil particles or the like contaminants ejected from the suction member 81 as the reverse flow of the blow-by gas can scarcely stay in the bent or elbow portion and is discharged from the inlet port 80 without fail.

Thus, the suction member 81 can be positively prevented from being plugged. In other words, the inherent function of the suction member 81 for taking in the recirculating air a in the ordinary operation state can be maintained without being impaired.

Embodiment 12

In conjunction with the air intake systems according to the second to eleventh embodiments, no description has been made particularly of the geometry or shape of the bent or elbow portion of the suction member 81 of the recirculating air passage 8. In this conjunction, it should be mentioned that when the second pipe-like section 81b is used, the outer peripheral surface or inner peripheral surface of the bent portion intervening between the first pipe-like section 81a and the second pipe-like section 81b may be so formed as to present a curved surface.

Figure 23:
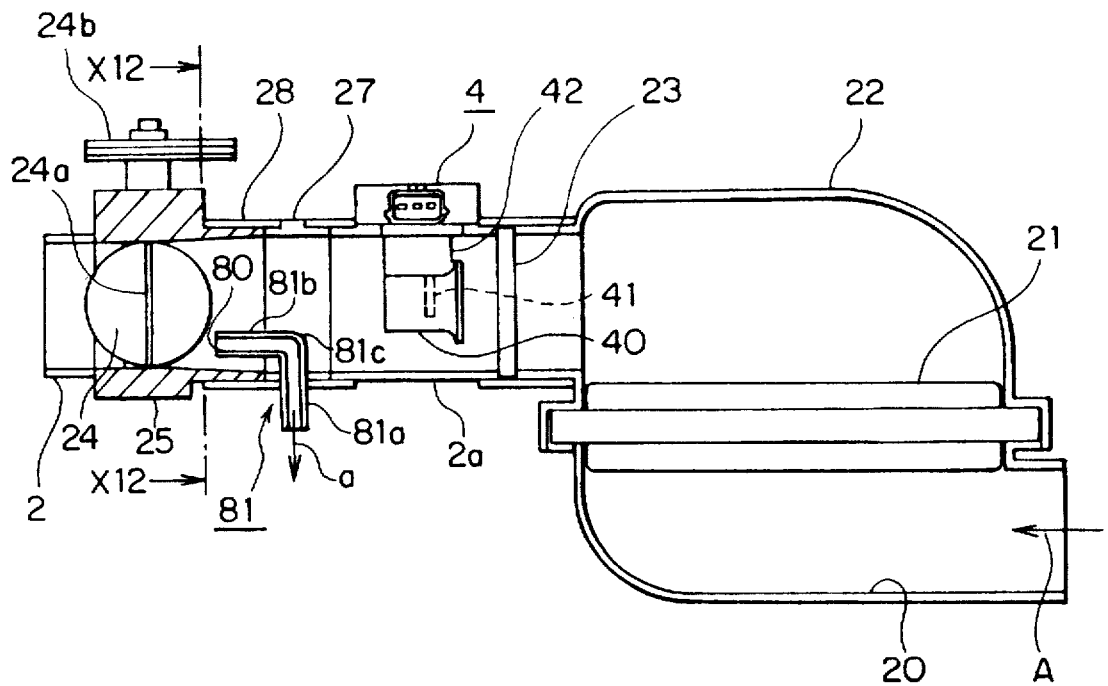
FIG. 23 is a side elevational sectional view showing a major portion of an air intake system according to a twelfth embodiment of the invention.
Figure 24:
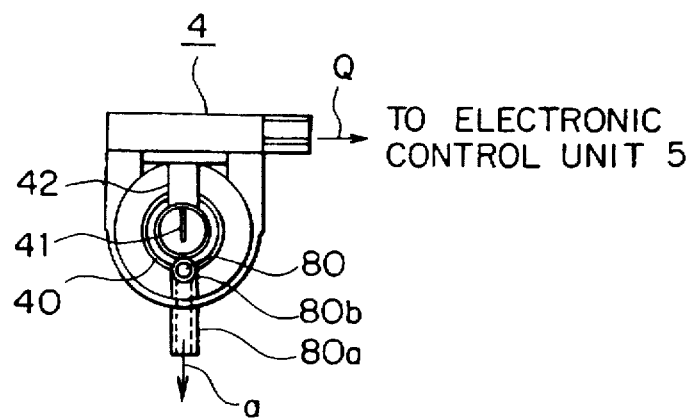
FIG. 24 is a sectional view of the same taken along a line X12—X12 shown in FIG. 23.

FIG. 23 is a side elevational sectional view showing a major portion of the air intake system according to an twelfth embodiment of the invention, and FIG. 24 is a sectional view of the same taken along a line X12—X12 shown in FIG. 23.

In the figures, the components same as or equivalent to those described hereinbefore are denoted by like reference characters and repeated description thereof is omitted. Further, the arrangement and the components not shown in FIGS. 23 and 24 are similar to those shown in FIG. 27. Furthermore, the basic operations of the air intake system and the positive crankcase ventilation system are similar to those of the conventional systems described previously by reference to FIG. 27.

Referring to FIGS. 23 and 24, it can be seen that the bent or elbow portion 81c intervening between the first pipe-like section 81a and the second pipe-like section 81b presents a curvilinear surface with the inner peripheral surface of the bent portion 81c being also curvilinear.

By imparting the curvilinear surface to the outer periphery of the bent portion 81c as mentioned above, the turbulence and/or stagnation of the intake air A becomes more difficult to occur in the bent portion 81c. Thus, the fluid resistance components for the intake air A can further be suppressed.

Additionally, by forming the inner periphery of the bent portion 81c in a curvilinear surface, the blow-by gas B ejected from the suction member 81 as the reverse or backward flow and carrying oil particles or the like contaminants can scarcely stay in the bent portion 81c but is discharged from the inlet port 80 without fail. Consequently, the suction member 81 is positively prevented from being plugged. In other words, the inherent function of the suction member 81 for taking in the recirculating air a can be maintained without being impaired.

Although it has been described that the inner and outer peripheries of the bent portion 81c are so formed as to present curvilinear surfaces, respectively, it is conceivable to form only one of the outer periphery and the inner periphery of the bent portion 81c in a curvilinear surface with a view to enhancing the flowability of the intake air A and ejection of the blow-by gas B.

Embodiment 13

In the air intake systems according to the second to twelfth embodiments of the invention, the inlet port 80 of the recirculating air passage 8 is so disposed that the inlet port 80 is oriented toward the throttle valve 24, i.e., in the downstream direction. However, when the second pipe-like section 81b is employed, the inlet port 80 may be opened in other direction.

Figure 25:
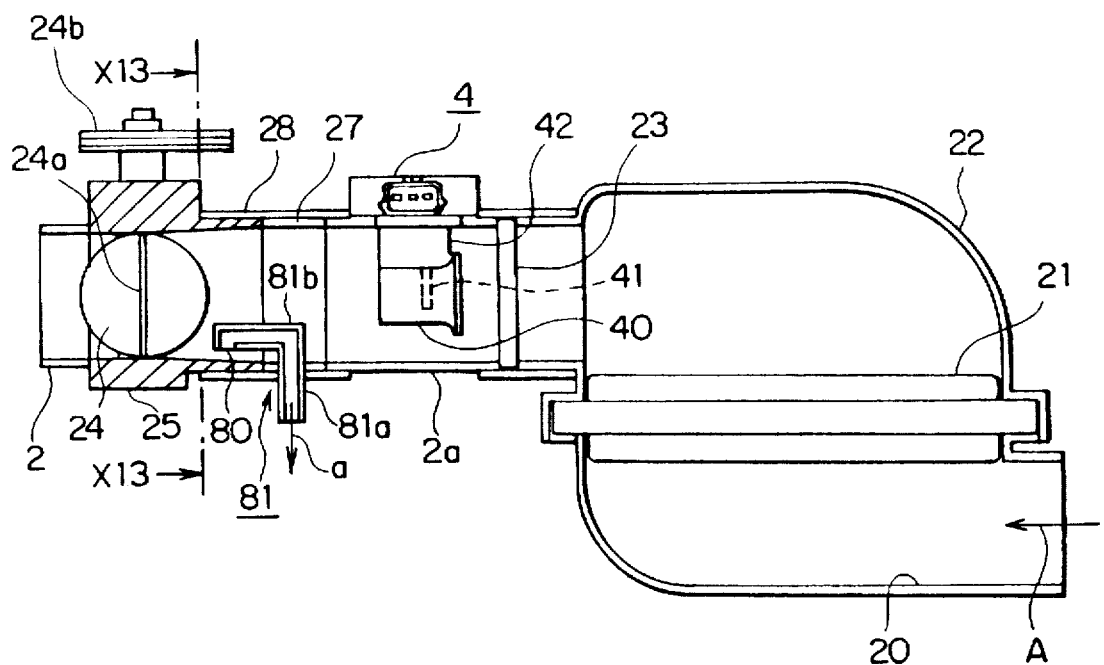
FIG. 25 is a side elevational sectional view showing a major portion of an air intake system according to a thirteenth embodiment of the invention.
Figure 26:
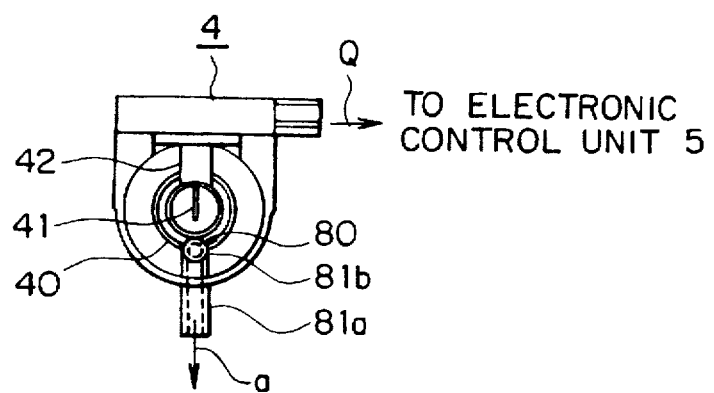
FIG. 26 is a sectional view of the same taken along a line X13—X13 shown in FIG. 25.

FIG. 25 is a side elevational sectional view showing a major portion of the air intake system according to a thirteenth embodiment of the invention, and FIG. 26 is a sectional view of the same taken along a line X13—X13 shown in FIG. 25.

In the figures, the components same as or equivalent to those described hereinbefore are denoted by like reference characters and repeated description thereof is omitted. Further, the arrangement as well as the components not shown in FIGS. 25 and 26 are similar to those shown in FIG. 27. Furthermore, the basic operations of the air intake system and the positive crankcase ventilation system are similar to those of the conventional systems described hereinbefore by reference to FIG. 27.

In the air intake system according to the instant embodiment of the invention, the inlet port 80 of the recirculating air passage 8 is so opened as to face oppositely to the inner wall of the intake air passage 2a.

Since the suction member 81 is of such a shape which makes it impossible to form the suction member 81 integrally with the conduit member 27, the suction member 81 is formed separately from the conduit member 27 which may be formed by a resin molding method, wherein the suction member 81 is joined to the conduit member 27, for example, by a pressure fitting.

As can be seen in FIG. 25, by disposing the inlet port 80 in opposition to the inner wall of the inlet port 80, oil particles or the like contaminant tend to be deposited on the inner wall surface of the intake air passage 2a upon ejection of the blow-by gas B reversely from the inlet port 80 of the recirculating air passage 8. Consequently, the contaminants are unlikely to diffuse within the inner space of the intake air passage 2a, whereby the sensor element 41 of the flow sensor 4 can be protected against contamination more positively.

Besides, because the inlet port 80 is bent downwardly as viewed in FIG. 25, amplitude of air pressure pulsation which may take place upon suction of the recirculating air a can be attenuated, whereby the influence of variation in the flow of the recirculating air a to the flow sensor 4 can further be mitigated.

In the case of the air intake system shown in FIG. 25, the inlet port 80 is opened, facing oppositely to the inner wall of the intake air passage 2a, the inlet port 80 may be opened in other direction differing from that in which the intake air A flows through the intake air passage 2a when only the suppression of the influence due to variation in the flow rate of the recirculating air a is aimed.

Embodiment 14

In the air intake systems according to the first to thirteenth embodiments of the invention described above, the suction member 81 of the recirculating air passage 8 is realized by using a pipe-like member which is so mounted as to project into the inner space of the intake air passage 2a or by a combination of the first pipe-like section 81a and the second pipe-like section 81b, it should be understood that the invention is never restricted exactly to such implementation of the suction member 81. By way of example, the suction member 81 of the recirculating air passage 8 may be realized by using a pipe-like member which is not definitely bent but curved or disposed obliquely.

Besides, the suction member 81 of the recirculating air passage 8 constituted by an air introducing passage disposed obliquely or formed in a curved shape may be provided in the intake air passage 2a.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the air intake systems have been described individually in conjunction with the third to thirteenth embodiments, respectively, it can readily be understood that the air intake systems disclosed above (third to thirteenth embodiments) may be synergistically combined.

Accordingly, all suitable modifications and equivalents may be resorted to, falling within the spirit and scope of the invention.

What is claimed is:

1. An air intake system for an internal combustion engine, comprising:

an intake air passage for supplying air into a cylinder of an internal combustion engine;

an air cleaner disposed in said intake air passage at a position near to an intake port of said intake air passage;

a flow sensor disposed within said intake air passage at a position downstream of said air cleaner for detecting an intake air flow fed to said cylinder;

a throttle valve disposed within said intake air passage at a position downstream of said flow sensor and adapted to be opened and closed for adjusting said intake air flow; and positive crankcase ventilation means for recirculating a blow-by gas leaking into a crankcase connected to said cylinder into said intake air passage;

wherein said positive crankcase ventilation means includes:

a communicating passage for communicating an interior of said crankcase with that of a head cover assembly of said cylinder;

a recirculating passage for introducing said blow-by gas from said head cover assembly into said intake air passage at a location downstream of said throttle valve; and a recirculating air passage for introducing recirculating air into said head cover assembly from said intake air passage at a location intermediate between said flow sensor and said throttle valve;

wherein said recirculating air passage has a suction member having one end portion disposed within said intake air passage, said end portion defining an air inlet passage having an inlet port disposed downstream from a midpoint of an entry of said suction member into said intake air passage.

2. An air intake system for an internal combustion engine according to claim 1, wherein said suction member of said recirculating air passage includes a pipe-like member projecting into said intake air passage; and an inlet port formed in the vicinity of a tip end of said pipe-like member, wherein said inlet port is oriented in a downstream direction in which air flows through said intake air passage.

3. An air intake system for an internal combustion engine according to claim 1, said suction member of said recirculating air passage includes:

a first pipe-like section projecting into said intake air passage;

a second pipe-like section extending from one end of said first pipe-like section in said downstream direction within said intake air passage; and an inlet port provided in the vicinity of a tip end portion of said second pipe-like section.

4. An air intake system for an internal combustion engine according to claim 1, wherein said flow sensor is constituted by a heat-sensitive flow sensor.

5. An air intake system for an internal combustion engine according to claim 1, wherein said suction member of said recirculating air passage is disposed such that at least a part thereof is covered by a shadow of a supporting member for said flow sensor as projected in said downstream direction.

6. An air intake system for an internal combustion engine according to claim 1,
   wherein said suction member of said recirculating air passage is disposed at a position opposite to a supporting member for said flow sensor as viewed in a direction diametrically of said intake air passage.

7. An air intake system for an internal combustion engine according to claim 1,
   wherein said suction member of said recirculating air passage is disposed at a location in the vicinity of an inner wall of said intake air passage.

8. An air intake system for an internal combustion engine according to claim 1,
   wherein a distance between the sensor element of said flow sensor and said inlet port of said recirculating air passage is dimensioned to be greater than or equal to a half of an inner diameter of said intake air passage.

9. An air intake system for an internal combustion engine according to claim 1,
   wherein at least a portion of said intake air passage accommodating therein said flow sensor, said suction member of said recirculating air passage and said throttle valve is so disposed that said flow sensor disposed at an upstream side assumes a position higher than a position at which said inlet port of said recirculating air passage is disposed at a downstream side relative to said flow sensor.

10. An air intake system for an internal combustion engine according to claim 1,
    wherein said inlet port of said recirculating air passage is so disposed as to face other portion of said throttle valve than a bearing thereof.

11. An air intake system for an internal combustion engine according to claim 1,
    further comprising:
    a throttle body constituting a part of said intake air passage and holing said throttle valve,
    wherein said suction member of said recirculating air passage is implemented integrally with said throttle body.

12. An air intake system for an internal combustion engine according to claim 1,
    wherein said suction member of said recirculating air passage is implemented integrally with a conduit member which constitutes a part of said intake air passage.

13. An air intake system for an internal combustion engine according to claim 12,
    wherein said suction member of said recirculating air passage is implemented integrally with said flow sensor through the medium of said conduit member.

14. An air intake system for an internal combustion engine according to claim 12,
    wherein an inlet port side of said conduit member is implemented integrally with a downstream-side case member of said air cleaner.

15. An air intake system for an internal combustion engine according to claim 3,
    further comprising:
    a flow sensor holding member constituting a part of said intake air passage and adapted to hold said flow sensor; and
    a throttle body constituting a part of said intake air passage and adapted to hold said throttle valve,
    wherein said flow sensor holding member and said throttle body are joined together by means of a securing member,
    wherein said first pipe-like section is so disposed as to project into said flow sensor holding member, and
    wherein the inlet port provided in said second pipe-like section is disposed at a location downstream of said securing member.

16. An air intake system for an internal combustion engine according to claim 15,
    wherein a part of said second pipe-like section is so disposed as to partially overlap said flow sensor as viewed in a longitudinal direction.

17. An air intake system for an internal combustion engine according to claim 3,
    wherein said inlet port of said second pipe-like section has a flow cross-section elongated in a circumferential direction along an inner peripheral surface of said intake air passage.

18. An air intake system for an internal combustion engine according to claim 3,
    wherein an inner diameter of said second pipe-like section is designed greater than that of said first pipe-like section.

19. An air intake system for an internal combustion engine according to claim 3,
    wherein said inlet port of said recirculating air passage is opened in a direction differing from said downstream direction in which the intake air flows through said intake air passage.

20. An air intake system for an internal combustion engine according to claim 19,
    wherein said inlet port of said recirculating air passage is opened facing oppositely to an inner wall of the intake air passage.

* * * * *